(12) United States Patent
Rabin et al.

(10) Patent No.: US 7,991,995 B2
(45) Date of Patent: **\*Aug. 2, 2011**

(54) METHOD AND APPARATUS FOR PROTECTING INFORMATION AND PRIVACY

(75) Inventors: Michael O. Rabin, Cambridge, MA (US); Dennis E. Shasha, New York, NY (US); Yossi Beinart, New York, NY (US); Ramon Caceres, New York, NY (US); Timir Karia, New York, NY (US); David Molnar, Cambridge, MA (US); Sean Rolinson, New York, NY (US)

(73) Assignee: ShieldIP, Inc., New York, NY (US)

( \* ) Notice: Subject to any disclaimer, the term of this patent is extended or adjusted under 35 U.S.C. 154(b) by 477 days.

This patent is subject to a terminal disclaimer.

(21) Appl. No.: 12/143,485

(22) Filed: Jun. 20, 2008

(65) Prior Publication Data
US 2008/0282086 A1 Nov. 13, 2008

Related U.S. Application Data

(63) Continuation of application No. 10/429,218, filed on May 2, 2003, now Pat. No. 7,406,593.

(60) Provisional application No. 60/377,580, filed on May 2, 2002.

(51) Int. Cl.
*H04L 29/06* (2006.01)
*H04L 9/32* (2006.01)
*G06F 21/00* (2006.01)
*G06F 7/04* (2006.01)

(52) U.S. Cl. ............ 713/155; 726/33; 709/217; 705/51; 705/65

(58) Field of Classification Search ................. None
See application file for complete search history.

(56) References Cited

U.S. PATENT DOCUMENTS 3,609,697 A 9/1971 Blevins et al.
(Continued)

FOREIGN PATENT DOCUMENTS

EP 0 715 243 A1 6/1996
(Continued)

OTHER PUBLICATIONS

Lee, Hyung-Woo. "Information Hiding for EC: Public Key Traitor Tracing for Digital Copyright Protection". IEEE International Symposium on Industrial Electronics. Pub. Date: Jun. 2001. Relevant pp. 1357-1362. Found on the World Wide Web at: http://ieeexplore.ieee.org/stamp/stamp.jsp?tp=&arnumber=931679.\*

(Continued)

*Primary Examiner* — Nathan Flynn
*Assistant Examiner* — Jeremiah Avery
(74) *Attorney, Agent, or Firm* — Hamilton, Brook, Smith & Reynolds, P.C.

(57) ABSTRACT

A system for protecting software against piracy while protecting a user's privacy enables enhancements to the protection software in a user device and extended protections against piracy. The protection system allows the user device to postpone validation of purchased tags stored in a tag table for installed software and to re-establish ownership of a tag table to recover from invalidation of a tag table identifier value resulting from revelation of a tag table identifier value. Continued use of the tag table is provided by the use of credits associated with a tag table. A protection center is protected against denial of service attacks by making calls to the protection center cost time or money to the attackers.

20 Claims, 20 Drawing Sheets

U.S. PATENT DOCUMENTS

| | | | |
|---|---|---|---|
| 3,996,449 A | | 12/1976 | Attanasio et al. |
| 4,458,315 A | | 7/1984 | Uchenick |
| 4,658,093 A | | 4/1987 | Hellman |
| 4,866,769 A | | 9/1989 | Karp |
| 5,023,907 A | | 6/1991 | Johnson et al. |
| 5,109,413 A | | 4/1992 | Comerford et al. |
| 5,132,992 A | | 7/1992 | Yurt et al. |
| 5,138,712 A | | 8/1992 | Corbin |
| 5,260,999 A | | 11/1993 | Wyman |
| 5,375,206 A | | 12/1994 | Hunter et al. |
| 5,483,658 A | | 1/1996 | Grube et al. |
| 5,509,074 A | * | 4/1996 | Choudhury et al. .......... 713/176 |
| 5,579,222 A | | 11/1996 | Bains et al. |
| 5,598,470 A | | 1/1997 | Cooper et al. |
| 5,606,663 A | | 2/1997 | Kadooka |
| 5,613,004 A | | 3/1997 | Cooperman et al. |
| 5,646,997 A | | 7/1997 | Barton |
| 5,671,412 A | | 9/1997 | Christiano |
| 5,719,941 A | | 2/1998 | Swift et al. |
| 5,724,425 A | | 3/1998 | Chang et al. |
| 5,745,569 A | | 4/1998 | Moskowitz et al. |
| 5,748,740 A | * | 5/1998 | Curry et al. ....................... 705/65 |
| 5,757,909 A | * | 5/1998 | Park .............................. 380/201 |
| 5,761,651 A | | 6/1998 | Hasebe et al. |
| 5,825,883 A | | 10/1998 | Archibald et al. |
| 5,872,844 A | | 2/1999 | Yacobi |
| 5,892,900 A | | 4/1999 | Ginter et al. |
| 5,910,987 A | | 6/1999 | Ginter et al. |
| 5,915,019 A | | 6/1999 | Ginter et al. |
| 5,917,912 A | | 6/1999 | Ginter et al. |
| 5,920,861 A | | 7/1999 | Hall et al. |
| 5,922,208 A | | 7/1999 | Demmers |
| 5,924,094 A | | 7/1999 | Sutter |
| 5,926,624 A | | 7/1999 | Katz et al. |
| 5,933,498 A | | 8/1999 | Schneck et al. |
| 5,943,422 A | | 8/1999 | Van Wie et al. |
| 5,968,175 A | * | 10/1999 | Morishita et al. ................ 726/28 |
| 5,982,892 A | | 11/1999 | Hicks et al. |
| 6,011,848 A | * | 1/2000 | Kanda et al. .................. 713/170 |
| 6,052,780 A | | 4/2000 | Glover |
| 6,108,644 A | | 8/2000 | Goldschlag et al. |
| 6,115,802 A | | 9/2000 | Tock et al. |
| 6,122,403 A | | 9/2000 | Rhoads |
| 6,131,162 A | * | 10/2000 | Yoshiura et al. .............. 713/176 |
| 6,134,327 A | | 10/2000 | Van Oorschot |
| 6,165,072 A | | 12/2000 | Davis et al. |
| 6,169,976 B1 | * | 1/2001 | Colosso ........................... 705/59 |
| 6,170,058 B1 | | 1/2001 | Kausik |
| 6,170,060 B1 | | 1/2001 | Mott et al. |
| 6,173,446 B1 | | 1/2001 | Khan et al. |
| 6,195,432 B1 | | 2/2001 | Takahashi et al. |
| 6,237,095 B1 | | 5/2001 | Curry et al. |
| 6,240,184 B1 | | 5/2001 | Huynh et al. |
| 6,253,193 B1 | | 6/2001 | Ginter et al. |
| 6,341,352 B1 | | 1/2002 | Child et al. |
| 6,553,413 B1 | | 4/2003 | Leighton et al. |
| 6,594,696 B1 | | 7/2003 | Walker et al. |
| 6,658,423 B1 | | 12/2003 | Pugh et al. |
| 6,691,229 B1 | | 2/2004 | Nelson |
| 6,697,948 B1 | | 2/2004 | Rabin et al. |
| 6,820,063 B1 | * | 11/2004 | England et al. .................. 705/54 |
| 6,857,067 B2 | * | 2/2005 | Edelman ........................ 713/155 |
| 6,871,276 B1 | | 3/2005 | Simon |
| 6,889,209 B1 | | 5/2005 | Rabin et al. |
| 6,889,325 B1 | | 5/2005 | Sipman et al. |
| 6,920,436 B2 | | 7/2005 | Stefik et al. |
| 6,920,567 B1 | | 7/2005 | Doherty et al. |
| 6,925,497 B1 | | 8/2005 | Vetrivelkumaran et al. |
| 6,948,070 B1 | | 9/2005 | Ginter et al. |
| 6,959,291 B1 | | 10/2005 | Armstrong et al. |
| 6,963,859 B2 | | 11/2005 | Stefik et al. |
| 7,043,636 B2 | | 5/2006 | Smeets |
| 7,073,197 B2 | | 7/2006 | Rabin et al. |
| 7,110,982 B2 | | 9/2006 | Feldman et al. |
| 7,110,984 B1 | * | 9/2006 | Spagna et al. ................... 705/57 |
| 7,131,144 B2 | | 10/2006 | Rabin et al. |
| 7,159,116 B2 | | 1/2007 | Moskowitz |
| 7,162,642 B2 | * | 1/2007 | Schumann et al. ........... 713/189 |
| 7,194,439 B2 | | 3/2007 | Kassan et al. |
| 7,213,005 B2 | * | 5/2007 | Mourad et al. .................. 705/64 |
| 7,233,948 B1 | * | 6/2007 | Shamoon et al. ....... 348/E5.004 |
| 7,287,159 B2 | | 10/2007 | Rabin et al. |
| 7,415,440 B1 | * | 8/2008 | Fransdonk ...................... 705/59 |
| 7,747,873 B2 | | 6/2010 | Rabin et al. |
| 2002/0144115 A1 | | 10/2002 | Lemay et al. |
| 2003/0018613 A1 | | 1/2003 | Oytac |
| 2003/0191942 A1 | | 10/2003 | Sinha et al. |
| 2003/0220882 A1 | | 11/2003 | Rabin et al. |
| 2005/0010475 A1 | | 1/2005 | Perkowski et al. |
| 2005/0216760 A1 | | 9/2005 | Rabin et al. |

FOREIGN PATENT DOCUMENTS

| | | |
|---|---|---|
| EP | 0 715 244 A1 | 6/1996 |
| EP | 0 715 245 A1 | 6/1996 |
| EP | 0 715 246 A1 | 6/1996 |
| EP | 0 715 247 A1 | 6/1996 |
| JP | 411136618 A | 5/1999 |
| WO | WO 98/42098 | 9/1998 |
| WO | WO 98/45768 | 10/1998 |
| WO | WO 02/054341 A1 | 7/2002 |

OTHER PUBLICATIONS

Reed, Michael, et al., "Anonymous Connections and Onion Routing," IEEE Journal on Selected Areas in Communications, vol. 16, No. 4, May 1998 (13 pages).

Examination Report, EPO Application 03747638.9, 2 pages, dated May 27, 2009.

Digimarc: Digimarc Watermarking Technology Receives U.S. Patent, *Business Wire*, File 810, Jun. 11, 1997.

Kaplan, Mark A., "IBM Cryptolopes™, Super Distribution and Digital Rights Management," http://www.research.ibm.com/peop...plan/cryptolope-docs/crypap,html, 7 pages (1996).

Collberg, Christian and Thomborson, Clark, "Software Watermarking: Models and Dynamic Embeddings," 1999 Annual symposium on Principles of Programming Languages. Proceedings of the 26th ACM SIGPLAN-SIGACT symposium on Principles of programming languages:311-324. http://doi.acm.org/10.1145/292540.292569.

Esparza, Oscar et al., "Protecting Mobile Agents by using Traceability Techniques," 2003 Information Technology: Research and Education 2003 proceeding. ITRE2003 International Conference:264-268. http://ieeexplore.ieee.org/ie15/8953/28360/01270618.pdf?tp&arnumber=1270618&isnumb.

Hill, Keith, "A Perspective: The Role of Identifiers In Managing and Protecting Intellectual Property In the Digital Age." Proceedings of the IEEE, vol. 87, Issue 7, Jul. 1999. Relevant pp. 1228-1238. Found on the World Wide Web at: http://ieeexplore.ieee.org/ie15/5/16709/00771074.pdf?tp=&arnumber=771074&isnumber=16709.

Menezes, Alfred, J., et al., "Handbook of Applied Cryptography," CRC Press LLC, 1997.

\* cited by examiner

METHOD AND APPARATUS FOR PROTECTING INFORMATION AND PRIVACY

RELATED APPLICATIONS

This application is a continuation of U.S. application Ser. No. 10/429,218, filed on May 2, 2003, now U.S. Pat. No. 7,406,593, which claims the benefit of U.S. Provisional Application No. 60/377,580, filed on May 2, 2002.

The entire teachings of the above applications are incorporated herein by reference.

BACKGROUND OF THE INVENTION

Software or information piracy is the activity of using or making copies of software or information without the authorization of the creator or legitimate owner of that software or information. Piracy is prevalent in the computer software application industry where people frequently make unlicensed illegal copies of a software application. The application may be copied for use among a circle of acquaintances or for re-production and commercial profit. Other types of piracy include acts of copying information such as musical recordings or an electronically readable version of documentation or an electronic book. In all cases, piracy costs billions of dollars of lost profits to legitimate business annually.

The software and information technology industries have responded to the threat of piracy through the use of locking schemes. Locking schemes can include software locking mechanisms, licenses and specialized hardware devices which prevent unauthorized use of software, information, or an entire electronic device. These schemes seek to prevent adversaries from being able to freely copy software.

There are many types of software locking mechanisms. For example, a manufacturer can encrypt portions of a copy of a software program with an encryption key uniquely associated with that copy. A customer who purchases the software is given the associated decryption key which allows decryption and execution of the software. Another form of software protection mechanism involves a "Certificate of Authenticity" supplied with the purchase of a copy of a software program. The Certificate of Authenticity includes a unique number associated with the copy. During installation of the copy of software, the copy number is requested and must be entered correctly by the user. If the copy number entered matches a number expected by the installation program, the copy of the software is assumed to be legitimate and is installed and executed as being legitimate. If the number entered is incorrect, the software will not install properly. Neither of the above schemes provides full protection against illegal copying and use of software. For the scheme employing encryption, if the original customer wishes to distribute illegal copies, he or she needs only to transfer the copy together with the decryption key to others. Similarly, the original purchaser of the copy of software can circumvent the protection offered by the Certificate of Authenticity by passing the software along with the Certificate of Authenticity to other users.

Protection against piracy schemes often employ features of a User Device's operating system. Thus, it is important to protect the operating system against modifications that would circumvent the protections. Ensuring that an operating system is unmodified can be achieved though hardware. An example of a hardware protection scheme for the integrity of the operating system is provided in U.S. Pat. No. 3,996,449 which discloses a method for determining if a program or a portion of a program when running on a computer is unmodified. In this system, a hash function is applied to a user's identification code or key along with the text of the program itself in a special tamper-proof hardware checking device. The checking device compares a resulting value from the hash function with a verifier value to see if the program text is correct. If the text is correct, the program is allowed to execute on the device.

A hardware related approach assigns a unique identifier to each processor that can execute software. Software copies purchased for a User Device include the identifier of the processor on that device. When a User Device executes a software copy, the identifier included in that software copy is compared with the Device's processor identifier. Processing is enabled only if these two identifiers are equal. This approach has a number of drawbacks. In its basic version, there is no stopping a pirate from modifying a legitimate software copy by replacing the original identifier with the identifiers of the processors on which he or his illegal customers wish to install this software. Furthermore, this method inextricably links a software copy to a single User Device. This renders it impossible to move the software another User Device as required, for example, when a customer upgrades his computer. Finally, the unique processor identifier on User Devices has raised grave concerns of intrusion on users' privacy through monitoring their software purchases which are identified by the same number.

Digital water marking is a technique that places invisible, or inaudible identifying data in certain types of content primarily to identify the user to whom the content was sold. If that same content is found elsewhere, then the original buyer is suspected of participating in privacy.

Ideally, watermarks are persistent in that they can not be removed or altered without degrading the content. While these techniques contribute to detection of theft, they do not prevent someone from copying the content, so they require legal intervention to prevent continued copyright infringement. Further there are many attacks on such systems.

SUMMARY OF THE INVENTION

In accordance with the invention, a method for protecting software against piracy while protecting a user's privacy is presented. The method of protecting software enables enhancements to the protection software in a user device and extended protections against piracy. Protection information is signed at a protection center using a signature key. The protection information is sent from a protection center to a supervising program of a user device. The supervising program of the user device verifies the signature using a verification key for the protection center signature key. The protection information includes at least one of superfingerprints, a software validator, a software patch, a device-validator, digital signature verification keys and associated digital signature verification keys, a parameter package, a list of one-way function values, and a software update set.

The software validator may include a portion of software and a hash function value of the portion. The software patch may include new code for the supervising program and an operating system. The device-validator may check a property of the user device. The digital signature verification key lists may include names of entities authorized to sign messages employed in protection of software, and their associated digital signature verification keys. The parameter package may include parameter values to be employed by a supervising program on the user device for protection of software. The parameter values may be employed by the supervising program to enforce software protection parameter values and adjusted at different times.

The list of one-way function values may include a one-way function, a value, and an action. The value is a result of applying the one-way function to a second value.

A method of protecting software checks if use of software is dependent on purchase of another software. The method determines whether the software may be used by checking whether any combination of at least two tags together convey permission to use the software.

A protection center sends protection information to a class of user devices having common properties by signing a message including the protection information to be sent, the common properties, and an expiration time for the protection information. The signed message may be sent to user devices or at least one storage device and downloaded by one of the user devices from one of the other user devices or one of the storage devices. The signed message may be received by a supervising program on each user device. The supervising program verifies that the message has been signed by the protection center using a verification key on the user device, that the common properties correspond to one of a set of actual properties of the user device and a set of properties listed in the supervising program, and that the expiration time is greater than a current time. Upon successful verification, the user device accepts the message.

A secure authorization server conveys permission to a user device to perform an action by sending a value from the domain of a one way function. A supervising program on the user device applies the one-way function to the value to obtain a range value from a range of the one-way function. If the range value equals a stored range value from the range already held on the user device, the user device may perform that action during a time period associated with the value and the stored range value. The action may be postponement of a required call-up by the user device to a guardian center.

A secure authorization server conveys permission to a user device to perform an action by sending a value from the domain of a one way function. A supervising program on the user device verifies a signature on the signed message as coming from the secure authoritative server. If verified, the supervising program performs the action during the time period. The action may be postponement of a required call-up by the user device to a guardian center.

A user device is permitted to postpone validation of purchased tags stored in a tag table for installed software. A supervising program of the user device determines credits associated with the tag table identifier. Upon determining sufficient credits, the supervising program allows the tag table to remain valid at a first time. The first time is after a time to next call-up contained in a latest continuation message associated with the tag table.

Continued use of a tag table is provided by the use of credits associated with a tag table. Upon receiving a call-up for a tag table at a first time, the first time past a time to next call-up held in a last continuation message sent to a user device for the tag table, a guardian center updates in the next continuation message the credits remaining for the tag table based on one or more of the credits in the last continuation message, the first time, and the time to next call-up held in the last continuation message.

The guardian center may decrease the number of available credits, if the user device indicates in a call-up message that its user device descriptive values have significantly changed. The supervising program may prevent the use of credits if the user device descriptive values have changed significantly since the occurrence of a previous continuation message.

A system of call-ups including continuation messages are employed to prevent a tag table identifier to be present on multiple user devices. A continuation message is requested by storing a call-up message in a user device. The call-up message includes a. a tag table identifier value; b. a set of user device descriptive values; c. a large randomly generated number; and d. a hash function. A hash function is applied to the combination of the set of user device descriptive values and the large randomly generated number to provide a hash result value. The tag table identifier value and the hash result value in a call-up message are securely sent from the user device to a guardian center. Upon receiving the call-up message, the guardian center invalidates tag table identifier values that have participated in more than a specified number of call-ups over a specified time. The guardian center then forms a continuation message by signing a message containing the call-up message, and at least one of a list of valid tag table identifier values, a time to next call-up for each valid tag table identifier value and an indication of the invalid tag table identifier values. The guardian center then securely sends the continuation message to the user device. The supervising program on the user device verifies the signature on the continuation message and that the continuation message includes the call-up message. The supervising program invalidates the associated tag table for each invalidated tag table identifier value; and stores the continuation message.

A user device can re-establish ownership of a tag table to recover from invalidation of a tag table identifier value. The user device securely sends a message to an authorized server. The message includes a new tag identifier, a tag identifier, an original tag table identifier and an ownership certificate pertaining to the original tag table identifier. The authorized server verifies that the ownership certificate pertains to the original tag table identifier and securely sends a digitally signed message to the user device allowing the user device to employ the new tag table identifier. The authorized server creates an association between the second tag table identifier and the original tag table identifier. The new tag table identifier and the tag table identifier are both related to the original tag table identifier. The authorized server ensures that call-ups including the tag table identifier without the new tag table identifier are rejected.

The user device includes the new tag table identifier in a future call-up message. The guardian center verifies the association between the new table identifier and the original tag table identifier and the guardian center performs further processing based on the original tag table identifier.

Ownership of a tag table can be re-established by employing a one-way function. A user device securely sends a message including a new tag table identifier to an authorized server. The authorized server verifies that applying the one-way function to the new tag table identifier yields a tag table identifier. Said yielded tag table identifier is already stored on the authorized server and associated with an original tag table identifier. The new tag table identifier and said yielded tag table identifier are both related to the original tag table identifier. The authorized server creates an association between the new tag table identifier and the original tag table identifier and ensures that call-ups including said yielded tag table identifier not including the new tag table identifier are rejected. The user device includes the new tag table identifier in a call-up message. The guardian center verifies the association between the new table identifier and the original tag table identifier and performs further processing based on the original tag table identifier.

A tag can be obtained based on a proof of purchase created at another location, for example, a store. The proof of purchase is created by selecting a large random integer which is unlikely to be guessed, creating a message including the large random integer and adding the large random integer to a list of integers maintained by a vendor.

The message may include at least one of a name of a software, a hash value of the software, and a usage policy for the software. The message may be downloaded by the user and employed to obtain a tag for the software. The message may be associated with the software at a point of sale and transferred to a purchaser, securely concealed until opened by the purchaser and signed upon receipt of the message, the vendor checks whether the large random integer is in the list of integers and upon successful check, the vendor may allow issuance of a tag for software and remove the large random integer from the list of integers.

A method for protecting a protection center against denial of service attacks is presented. In one embodiment, a puzzle is formed at the protection center. The puzzle includes a function and a value in the range of the function. Execution of the function causes at least one of a registration or a call-up to the protection center to consume resources of a calling user device. The protection center sends the value to the requester of a service in the user device. The protection center receives the second value from the requester, tests whether the function applied to the second value equals the value in the range of the function and offers the service, if the test is successful.

In an alternate embodiment, a request including a token of monetary value is formed at a user device. The request requires resources of the user device. The request is sent to the protection center and granted only if the protection center verifies payment of the monetary value.

An organization seeking to maintain private information centers can have control of a verification and signature key pair, denoted an organization verification key and an organization signature key. An organization's security center is authorized to generate and use a signature key and verification key pair based on a master authorization signature key by allowing the security center to generate the signature and verification keys and signing with the master authorization signature key the organization verification key. The user device may recognize the validity of the organization verification key by verifying the signature of the master authorization signature key in the signed organization verification key.

Repudiation of a call-up message is prevented by requiring each user device to sign each call-up message with a key whose owner can be established by a third party.

A method of setting time on a trusted clock on a user device is presented. A time request containing a first large randomly generated number is sent to a certified time server. A supervising program in the user device waits for less than a specified number of seconds until the certified time server sends a signed message including a second large randomly generated number and a time value. The supervising program sets a trusted clock in the user device to the time value included in the signed message provided that the signed message from the certified time server has arrived within the specified number of seconds after the request and the second randomly generated number in the signed message is the same as the first randomly generated number in the request. Thereafter the supervising program advances the trusted clock value in accordance with elapsed time read from a counter.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
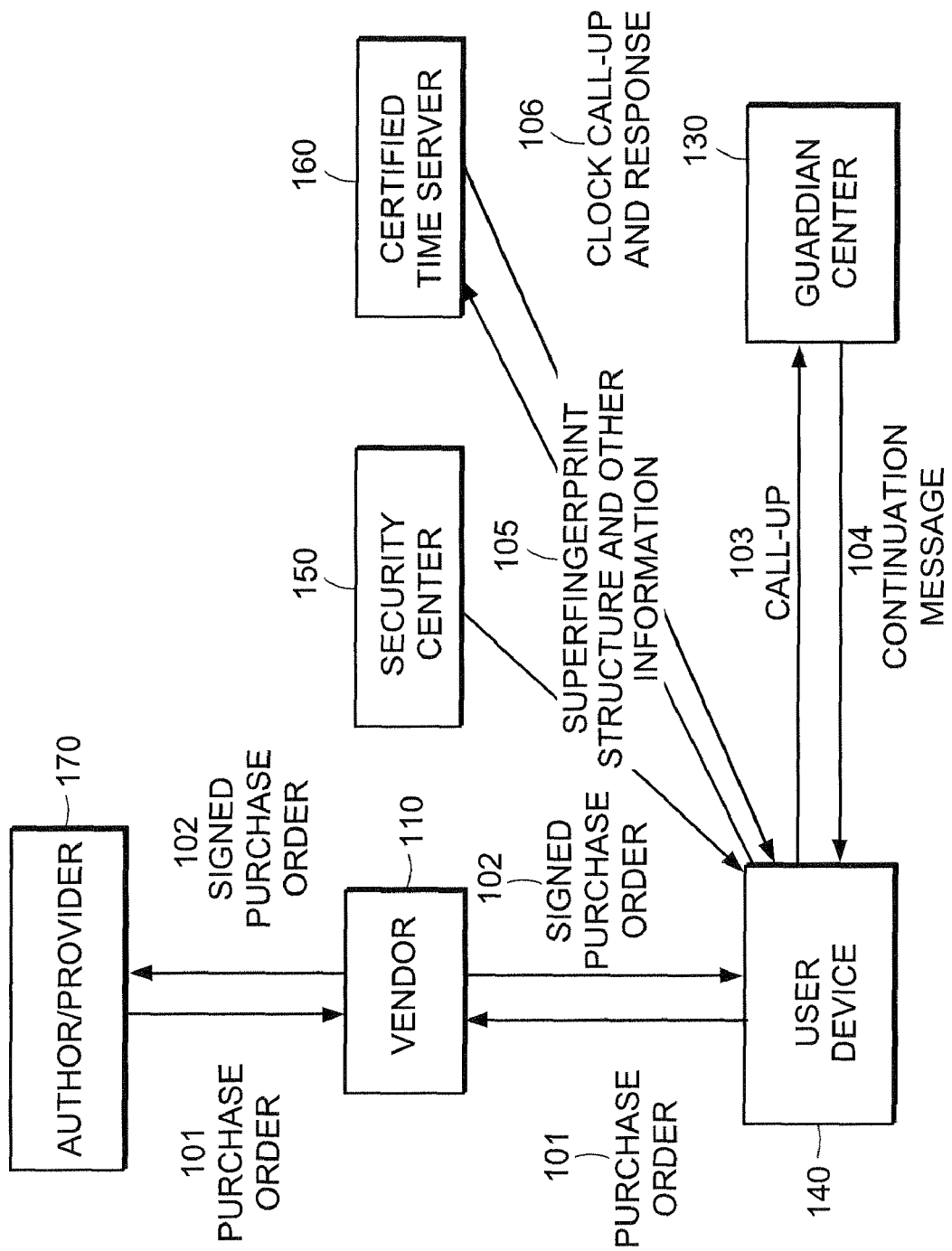
FIG. 1 illustrates a system for protecting software against piracy while protecting users' privacy.

A description of example embodiments of the invention follows.

Before description of embodiments of the invention are provided, definitions of terms to aid in understanding the various elements associated with the invention are provided as follows:

A Tag indicates a right to use a copy of some software. A Tag Table consists of a collection of Tags and other information. The Tag Table also includes a Tag Table header that uniquely identifies the Tag Table. The Tag Table header can include information concerning User Device use statistics and can include a Continuation Message. The Tag Table header also includes a Tag Table Identifier value ID. A User Device can have one or more Tag Tables, each with its own Tag Table Identifier value. To protect privacy, the only communication between a User Device and the outside world has to do with Tag Table identifiers, not with the underlying Tags.

Call-Ups initiated and executed by the Supervising Program from a User Device to a Guardian Center occur from time to time. Call-Ups are initiated in accordance with a Call-Up Policy, depending on whether a certain amount of usage of a copy of software has occurred, or a certain amount of time has elapsed since the last Call-Up, or when a network connection is made, or some combination of the above. A Call-Up may also be required soon after a Supervising Program has been booted. A Call-Up may be required when the difference between the current time as measured by an absolute time counter and the time from the last Call-Up exceeds a value specified in the Call-Up Policy.

Fields representing features of the User Device's (internal) environment which are given by User Device Descriptive Values "(UDDV)". Examples of User Device Descriptive Values include, but are not limited to, a User Device processor's unique serial number, the number of files of a specified kind stored on the User Device's non-volatile storage device, features and numerical values derived from the User Device's data structures describing the physical layout of the file system and other data in the storage device. The UDDVs are chosen so that they are only slowly changing, if at all, during use of the User Device.

A Superfingerprint is a collection of data and computer programs designed to enable the detection and subsequent prevention of use of an infringing copy of software or of an infringing use of a legitimate copy of software.

A hash function F is a mathematical function for mapping data X to data F(X) such that if X and Y are unequal, then it is highly likely that F(X) and F(Y) are unequal. In an example hash function, X can be a sequence of bytes. Let p be a randomly chosen, but henceforth-kept fixed, 64 bit prime number. The sequence X of bytes is viewed as a number (written to the base 256, where the bytes are the digits of that number) and F(X)=X mod p. Thus the value F(X) is a 64 bit string, no matter how long X is. Another example of a hash function is the identity function I(X)=X which simply reproduces the string X.

A one-way function H has the property that given X, it is easy to compute Y=H(X), but given the value Y and the function H, it is intractable to find a V such that H(V)=Y. The term "intractable" means that the computational time required is practically unfeasible in the size of X, according to the present state of the art. An example of a class of unaliasable hash functions is provided by the SHA-1 Federal Information Processing standard, published by the National Institute of Standards.

A nonce is a randomly chosen number or string intended to occur only once. In the present invention, nonces are often chosen to be large enough that they are unlikely to be guessed by chance.

Software is herein construed to be any digital information, including but not limited to, computer programs, text, data, databases, audio, video, images, or any other information capable of being represented digitally or as a signal, said software being accessed by or used on devices such as computers or special purpose devices. Use of a copy of software includes, but is not limited to, reading, displaying, storing, modifying, broadcasting, or executing that software.

Piracy of software in this invention means use of software in a manner that infringes on intellectual property rights or other rights in that software of the owner or provider of said software. Piracy of software includes, but is not limited to, making and using illegal copies, using a copy in a manner not permitted by the owner or provider of the software, reverse engineering the software and creating and using modified versions of the software without permission of the owner or provider of said software.

Further details are included in U.S. application Ser. No. 09/706,074, filed on Nov. 3, 2000, the contents of which are incorporated herein by reference.

A description of preferred embodiments of the invention follows.

Figure 2:
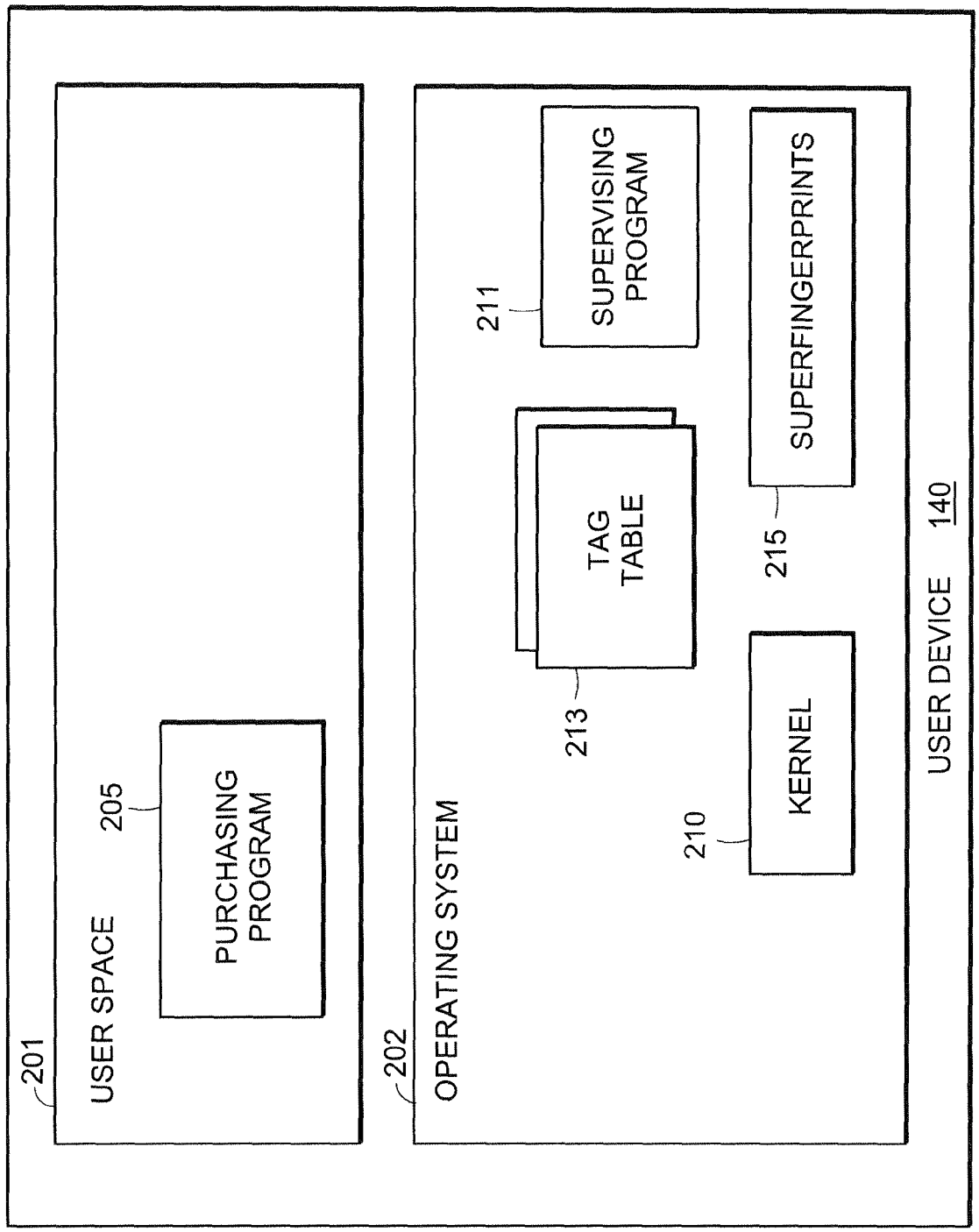
FIG. 2 illustrates the software architecture of the User Device shown in FIG. 1 including a User Space and an operating system.

FIG. 1 illustrates a system for protecting software against piracy while protecting users' privacy, the system including a Vendor 110, an Author or Provider of Software 170, a Guardian Center 130, additional Protection centers 150, a Certified Time Server 160, and a User Device 140. The Vendor 110 may be a physical, mail-order, web-based or other kind of store including a storefront for an author or provider of the Software. There is a multiplicity of User Devices 140, operated by users who may attempt to pirate software. The invention allows a multiplicity of each of the components in FIG. 1, but each of these components can potentially serve to enable purchases of software and to protect against piracy of Software on every User Device. When a user (not shown) at User Device 140 purchases software, the User Device or an agent of the User Device sends a Purchase Order 101 to a Vendor 110. Vendor 110, if the Purchase Order passes certain tests, signs the Purchase Order, or has the Author/Provider 170 sign it, and sends it to the User Device 140. The User Device installs the signed Purchase Order and related information as a Tag into a Tag Table (FIG. 2 213). Periodically, the User Device 140 issues a Call-Up 103 in which it sends information about one or more Tag Tables (FIG. 2, 213) to the Guardian Center "GC" 130. If the information sent to the Guardian Center 130 in the Call-Up 103 passes certain tests to be described later on, then the Guardian Center 130 will send a Continuation Message 104 back to the User Device indicating which of the one or more Tag Tables can be further used and the time interval with which the next Call-Up should occur. Other information may come either from the Guardian Center or the additional Protection Center 135. That information has the property that it may be sent to a whole class of machines sharing common properties (e.g., they run the same operating system on the same instruction set architecture). That information includes Superfingerprints as described in U.S. application Ser. No. 09/706,074 and other information as will be described below.

An exemplary User Device is found in FIG. 2. It includes a possibly insecure User Space 201 containing a Purchasing Program (alternatively, this program may reside on another device) and a secure operating system 202. "Secure" in this context means that the owner of the User Device cannot modify its contents. U.S. application Ser. No. 09/706,074, describes methods for ensuring such security. The Kernel 210 is a standard operating system kernel such as, Microsoft Windows 2000 sold by the Microsoft Corporation of Redmond, Wash. The Tag Table or Tag Tables 213 hold Tags each conveying a Vendor-specified Usage Policy for an associated copy of Software. A Tag T for a copy of software SW permits the use of SW provided that use accords with the Usage Policy of T and the Tag Table TT on which T is found is valid. The validity of TT is established by periodic Call-ups 103 (FIG. 1) and 104 (FIG. 1) to the Guardian Center 130 (FIG. 1). Superfingerprints 215 include data and programs used to identify Software. The Supervising Program 211 manages the protection against piracy and enforces software Usage Policies using the data in the one or more Tag Tables 213 and the Superfingerprints 215 as described in U.S. application Ser. No. 09/706,074. The current invention describes several enhancements to U.S. application Ser. No. 09/706,074.

1. Extensible Supervising Programs and Protection Information.

In order to incorporate new methods of protection and to counter emerging piracy attacks, it is useful to enhance and modify the Supervising Program or some other portion of the Operating System kernel from time to time. Also, from time to time, new instances of Software will require protection against piracy. These enhancements and extended protections against piracy are enabled by use of digitally signed Protection Information downloaded to the User Device from a Protection Information Center.

The Supervising Program on the User Device ensures that the Protection Information present on the Device is up-to-date in a manner described below. The Protection Information on a User Device includes but is not limited to at least one of the following:

i. Superfingerprints as described in U.S. application Ser. No. 09/706,074.

ii. A Software-Validator containing an identification of a portion of software SW_portion that should be present on the User Device and the hash function value of that portion, denoted H(SW_portion). Periodically, on the User Device, SW_portion is fetched and is compared against H(SW_portion). One use of Software-Validators is to verify portions of the Operating System.

iii. A Program Patch contains new code for the Supervising Program or some portion of the Operating System.

iv. A Device-Validator which is a procedure that checks some property of a User Device. Examples of such a property include but are not limited to the presence of certain hardware components.

v. Digital Signature Verification Key Lists containing names of entities authorized to sign various types of messages and their associated signature verification keys. Examples include but are not limited to pairs consisting of names of Vendors authorized to sign Purchase Orders 102 and signature verification keys of those Vendors; pairs consisting of a specific system component such as Protection Information Center 150, Author/Provider 170, Certified Time Server 160, or Guardian Center 130 and an associated signature verification key.

vi. A Parameter Package containing parameter values to be employed by the Supervising Program on a User Device when enforcing software piracy protection and that may require dynamic adjustments. A Parameter Package contents may include but is not limited to threshold values for software identification programs or times and conditions for the activation or deactivation of various Supervising Program functions.

vii. A User Device can obtain the right to perform certain actions by acquiring a secret value, where this secret value is verifiable using information already present on the User Device. An example of such an action is the delay of a mandated Call-Up message. Another example is the permission to use some copy of Software without a Tag or beyond the Usage Policy specified in a Tag. An exemplary implementation of this mechanism is to include in the Protection Information a Function-Value List comprising triples each including a one-way function, a value in the range of that function, and an action, e.g. (F1, W1, Action1), (F2, W2, Action2), . . . ,. In an alternative embodiment, portions of this list (perhaps the entire list) refer to the same function, so the list consists only of values in the range of that function and actions. A function f is a one-way function if it takes little time to compute the function value f(x) given f and x, but given f and a value y, it is computational intractable to determine an argument value x such that f(x)=y. In a typical application, the system of this invention disseminates an argument value V1 such that F1 (V1)=W1 thereby enabling Action1. An exemplary application of a Function-Value List in this invention is detailed in Section 4 and FIG. 6.

viii. Software Update Sets.

Figure 3:
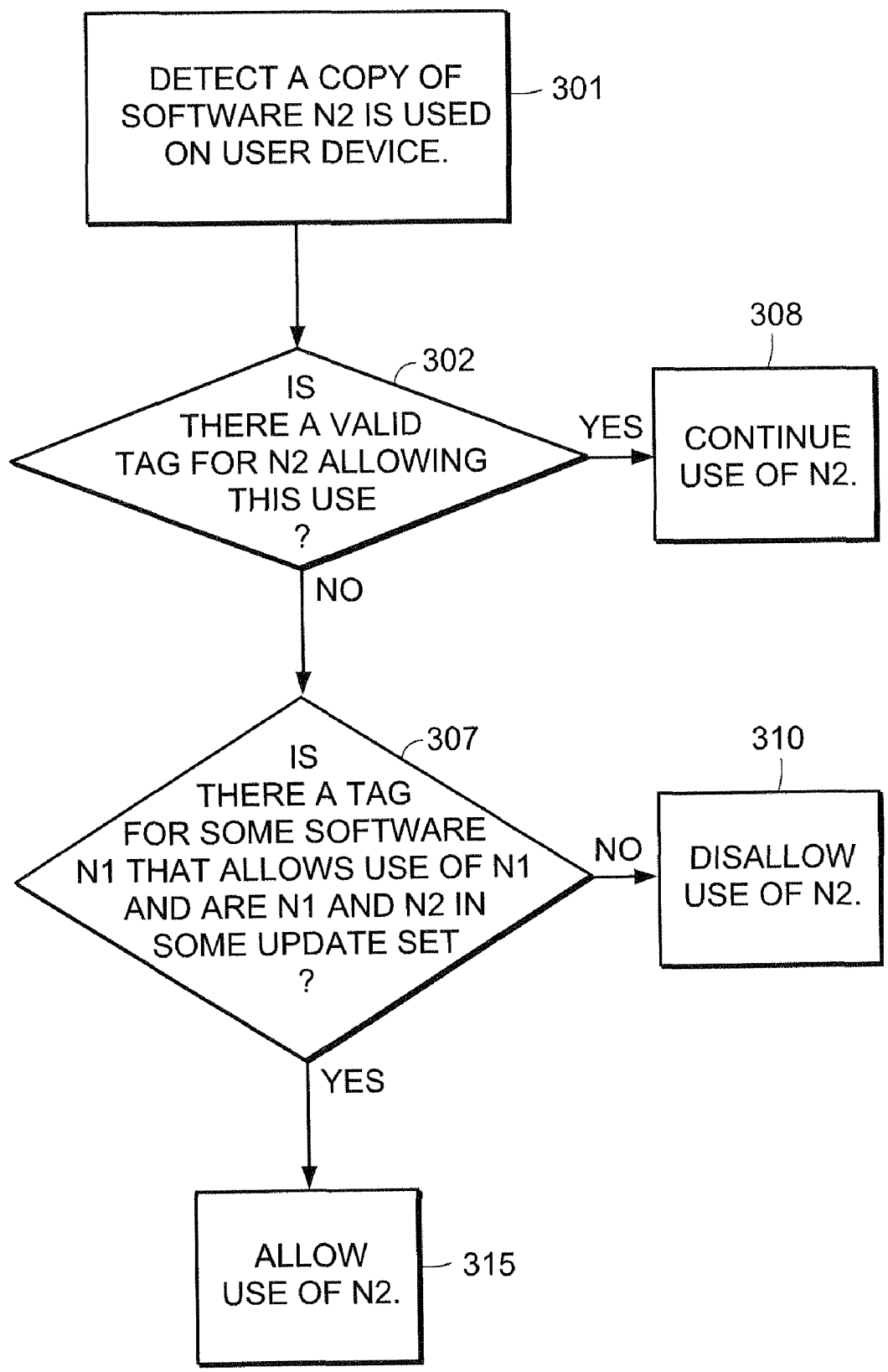
FIG. 3 is a flow chart illustrating the steps for allowing use of software.

Software Vendors routinely produce different versions of a particular software SW, e.g., different versions of the game SimCity produced by Electronic Arts of California. Sometimes upgrades from one version to another come free to a User who has purchased the first version. In that case, it is convenient for both the Vendor and the User to enable the User to use the newer version without having to secure a new signed Purchase Order. To this end, the present invention employs a Software Update Set. A Software Update Set includes information sufficient to identify each of the versions of SW so that presence of a Tag for any one of these versions automatically allows the use, subject to the Usage Policy, of any version in the Update Set. Thus referring to FIG. 3, if an Upgrade Set, not shown here, appears in the Protection Information on the User Device and includes copies of Software N1 and N2, there is on the User Device a valid Tag for N1, and the Supervising Program determines that N2 is being used on the User Device 301-307, then the Tag in combination with this Upgrade Set implies that N2 may be used 315.

2. Linked Tags.

Figure 4:
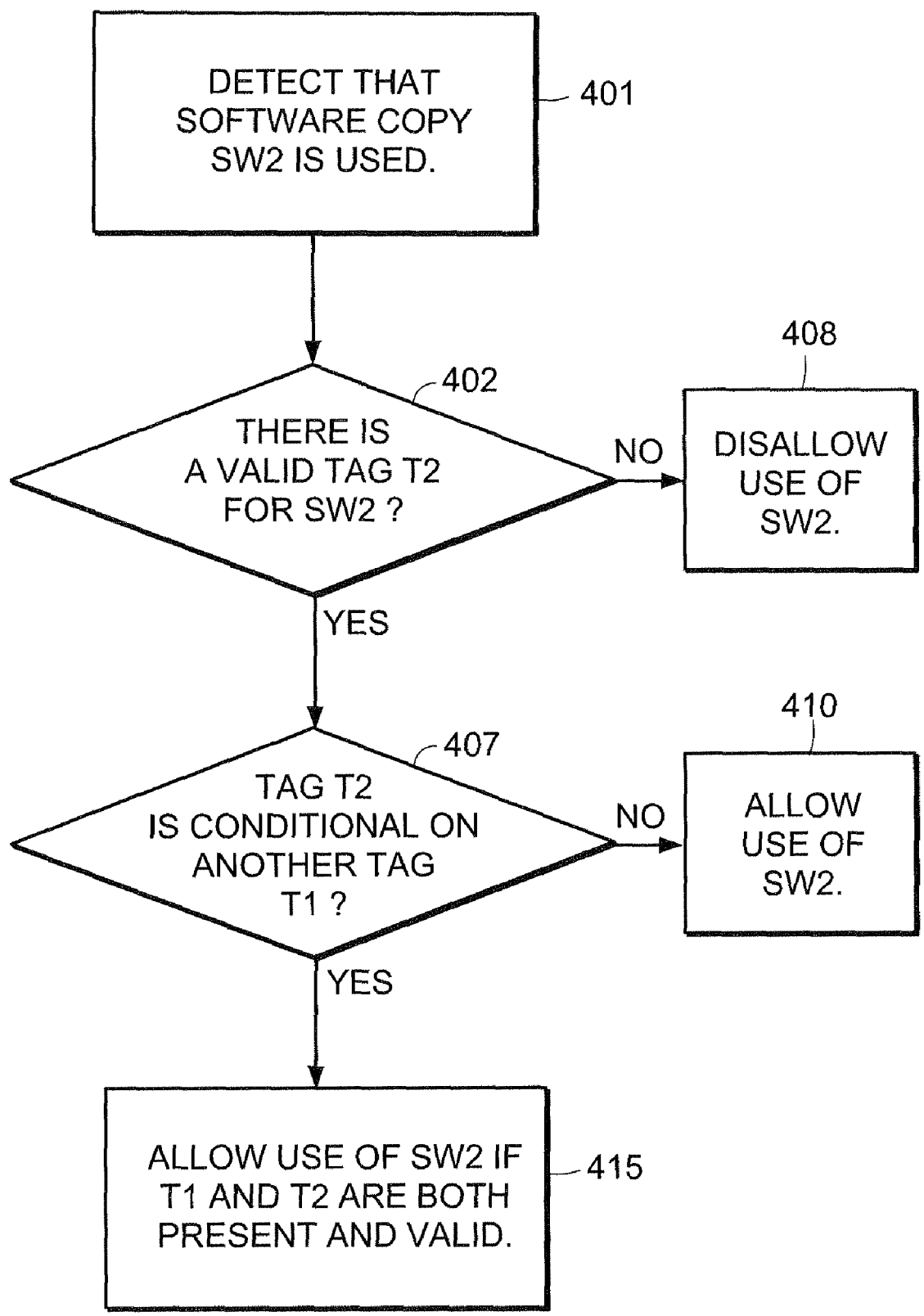
FIG. 4 is a flow chart illustrating the steps for allowing use of software based on two tags.

In certain situations, a Vendor may predicate the Usage Policy in a signed Purchase Order PO2 incorporated in a Tag T2 for Software SW2 on the presence in the User Device of a Tag T1 for some Software SW1. More generally, the conditioning may be on the presence of several Tags. An example is that the signed Purchase Order PO2 may be obtained at a reduced price if Software SW1 was purchased for use on the User Device. In an exemplary implementation of this functionality, the Usage Policy in PO2 explicitly requires the presence of a valid Tag T1 for Software SW1. Referring to FIG. 4, the Supervising Program determines that SW2 is used on the User Device 401, the Supervising Program searches for a valid tag T2 for software SW2 402. If no such tag is found, then use of software SW2 is disallowed 408. The Supervising Program checks 407 whether according to the tag T2 use of SW2 is conditioned on the presence of another tag T1, if not then use of SW2 is permitted in 410. If yes, then the Supervising Program allows in 415 use of SW2, if T1 is found and is valid.

3. Protection Information List Downloads.

Figure 5:
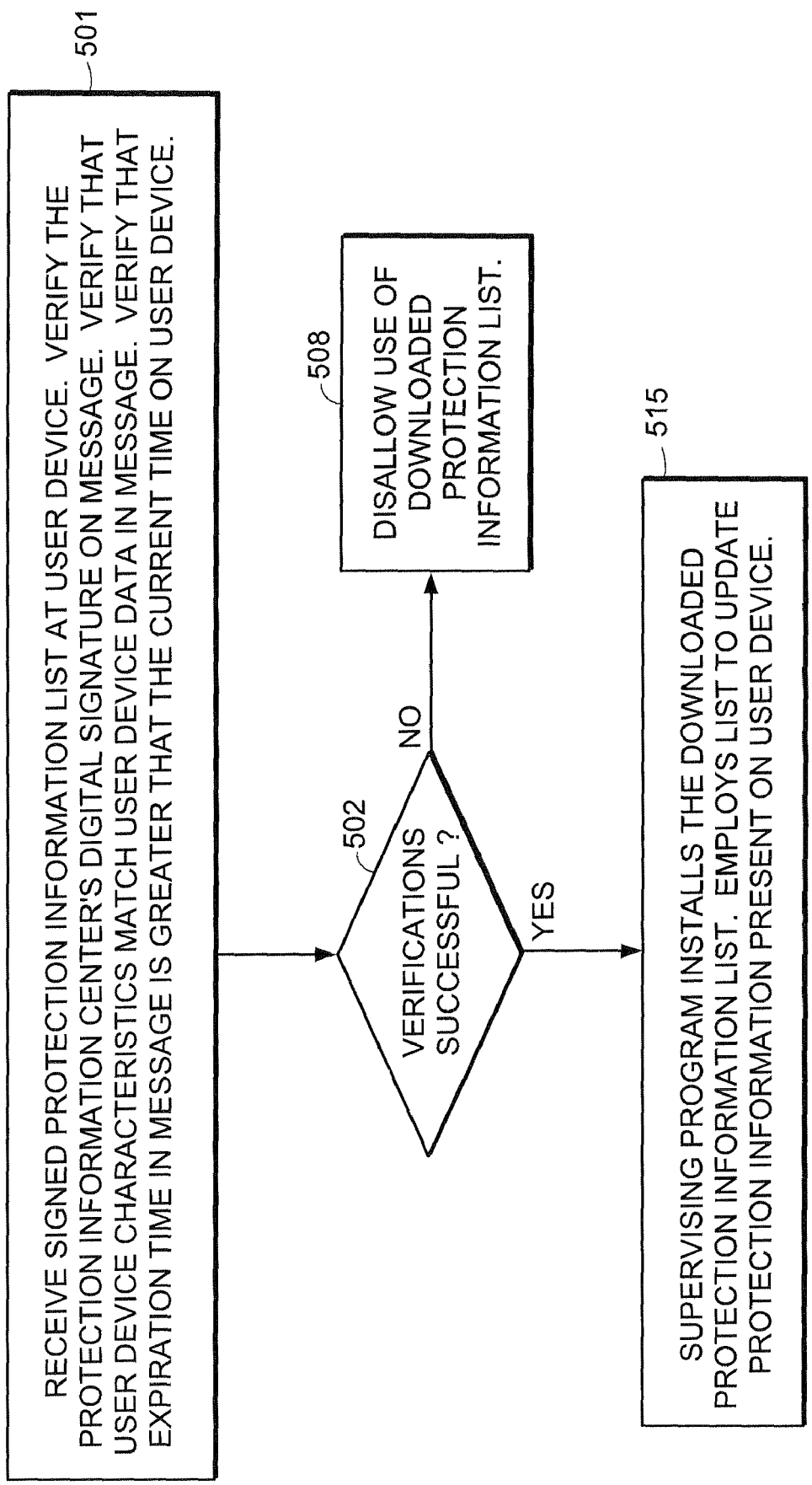
FIG. 5 is a flow chart illustrating the steps performed by the Supervising Program on the User Device upon receipt of a downloaded Protection Information List.

Protection Information on a User Device must be kept up-to-date at all times. In an exemplary embodiment, a Protection Information List downloaded from a Protection Information Center is used to update the Protection Information already present on the User Device. The downloaded List incorporates a date of expiration and data for matching the particular Protection Information List to a particular class of User Devices. The data used for matching the List to the User Device includes but is not limited to one or more of the following, the User Device type, such as a personal computer or a mobile hand-held device, the instruction set architecture of the processor in the User Device, the Operating System of this device. To achieve for the downloaded Protection Information List the requirements of currency and matching, the Supervising Program, or some agent acting for it, sends a request to a Protection Information Center or an agent of that Center. This request specifies the characteristics of the User Device to be matched by the Protection Information List. The Protection Information Center responds by sending an appropriate Protection Information List digitally signed by the Protection Information Center. The List also includes an expiration time so that the total message is SGN_PIC(User Device Data, expiration time, Protection Information List). FIG. 5 details the steps performed by the Supervising Program on the User Device upon receipt of the downloaded Protection Information List. At step 501, the Supervising Program receives the downloaded Protection Information List and performs the tests and verifications detailed. If verifications do not succeed, then at step 508 use of downloaded Protection Information List is disallowed. If verifications succeed, then at step 515 the Supervising Program installs the downloaded Protection Information List and uses it to update the Protection Information present on User Device.

Alternatively, a User Device may obtain an appropriate up-to-date Protection Information List by transferring from another User Device having the same User Device type or by transfer from some storage device. The fact that Protection Information Lists are digitally signed renders the particular source immaterial.

Upon receipt of a new Protection Information List, the Supervising Program on the User Device verifies (i) the Protection Information Center's digital signature on the message (ii) that the User Device Type in the message equals the User Device Type of the User Device on which the Supervising Program runs (iii) that the expiration time (encompassing a date, hour, and perhaps a minute in an exemplary embodiment) in the message is greater than the current time on the User Device. If any one of these verifications fails, then the Protection Information List is invalid. If they all succeed, then the Protection Information on the User Device is modified by the Supervising Program according to the Protection Information List.

4. Call-Up Graces.

In the preferred embodiment, the Continuation Message associated with Tag Table TT contains a field that indicates the time (or a time interval) when the next Call-Up should occur for TT. This is called the Time of Next Call-Up. If the Clock value on the User Device exceeds the Time of Next Call-Up, then the Tag Table TT and hence Tags in TT become inactive. An inactive Tag for Software SW does not convey permission to use of SW. For various reasons, including the failure of one or more Guardian Centers or of the network, it may be desirable to postpone the need for a Call-Up and thus to preserve the activity of the Tags in the Tag Table. Here are two exemplary embodiments of this postponement.

In one embodiment, a Protection Information Center causes a broadcast of a digitally signed message stating that a Call-Up normally required to be sent in a certain time interval may be postponed to a later interval. This broadcast may be performed over any one of a number of communication channels available at the time, including but not limited to cable, radio, television, newspaper, or telephone services.

Figure 6:
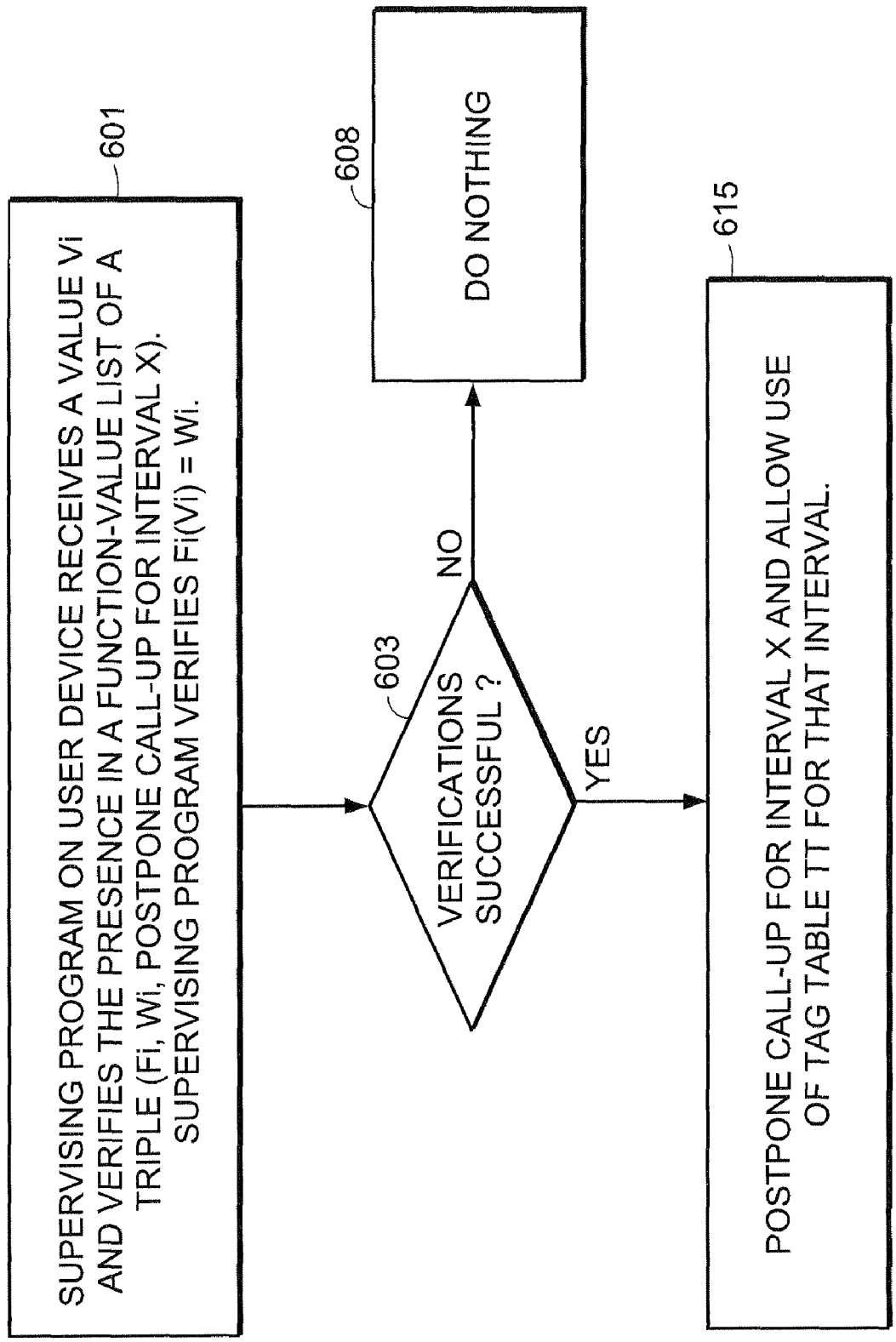
FIG. 6, is a flow chart illustrating the steps for obtaining a call-up postponement by use of a Function-Value List.

A second embodiment uses the Function-Value List. When the need arises to permit a postponement of Call-Ups for a time interval iX, the Protection Information Center arranges a broadcast of a value Vi to be used as follows. Recall that a function-value list is (or is equivalent to) a set of triples each consisting of a one-way function, a value in the range of that function, and an action (F1, W1, Action1), (F2, W2, Action2), .... Because the functions are one-way, it takes little time to compute the function value f(x) given f and x, but given f and a value y, it is computationally intractable to determine an argument value x such that $f(x)=y$. Referring to FIG. 6, and assuming that the User Device requires a Call-Up postponement for time period iX, the method for obtaining this postponement by use of the Function-Value List proceeds as follows. The Supervising Program obtains a value Vi by broadcast from a Protection Information Center. At step 601, the Supervising Program verifies the presence in a Function-Value List of the triple (Fi, Wi, Action_i) where Action_i allows a postponement of a required Call-Up until after the time interval i X (for example, a given day). The Supervising Program furthermore verifies that $F(Vi)=Wi$ 603. If verification fails, at step 608 the Supervising Program does nothing. If verification succeeds, the Supervising Program proceeds to step 615 and allows postponement of the Call-Up and continuing validity of the Tag Table TT, and the tags included in it, and continued use of the copies of software associated with those tags. As explained above, the Function-Value List is assumed to have been previously downloaded to the User Device as part of a Protection Information List. Alternatively, the Function-Value List may be included pre-installed in the Supervising Program, among other possibilities. The Protection Information Center may employ the same variety of broadcast possibilities as in the embodiment above. A possible advantage of this embodiment is that the value Vi required for the postponement can consist of fewer characters than the digitally signed message in the first embodiment, without sacrificing security, and thus can be conveniently entered into the User Device by hand.

5. Call-Up Procedure and Continuation Messages.

According to U.S. application Ser. No. 09/706,074, Tags controlling the use of software on the User Device are stored in Tag Tables where each Tag Table TT has a Tag Table Identifier Value TTID associated with it. Furthermore, the identifier TTID is incorporated in each of the tags stored in the tag table TT. This arrangement creates a link between software used on the user device and that User Device through the Tag Table TT. If it were possible to create copies of the Tag Table TT and the Tags therein on other User Devices, this would enable copies of software bought for use on one User Device to be illegally used on other User Devices thereby causing loss to the providers and vendors of said software. To prevent a Tag Table Identifier Value TTID from being present simultaneously on a multiplicity of User Devices, which would enable illegal multiple use of Tags and their associated Software, U.S. application Ser. No. 09/706,074 employs a system of Call-Ups. Typically, a Call-Up Message is prepared by the Supervising Program on a User Device with reference to one or more Tag Table Identifier Values and is sent to a Guardian Center. Responding to such a Call-Up, the Guardian Center performs certain tests and prepares and sends a Continuation Message specifying the usability status of the Tag Tables involved in the Call-Up.

In one exemplary embodiment, the Call-Up Message contains the following fields: TTID, HASH(UDDV, NONCE), where TTID is a Tag Table Identifier value (in other embodiments a whole list may be sent together); HASH is a hash function such as SHA-1; NONCE is a nonce; UDDV stands for the User Device Descriptive Values that characterize the current state of the User Device. The hash function value HASH(UDDV, NONCE) thus conceals the values of the UDDV and will be referred to as CONCEAL(UDDV).

The UDDV comprises information about the current state of the User Device, which includes but is not limited to one or more of: the number of files on the User Device, the sizes of files, the number of directories, characteristics of B-trees used to locate files, characteristics of indexes used to access data, a processor identifying number, a BIOS identifier, a network interface identifier, all the preceding in reference to the User Device in question. In alternate embodiments, the UDDV may further include biometric information, if a User Device is to be associated with a particular individual. The purpose of the NONCE is to conceal the values of the UDDV from the receiver of the Call-Up message.

The Continuation Message responding to a Call-Up Message includes the Call-Up Message as well as a Time Interval (T1, T2) within which the next Call-Up should occur, as well as a list of Tag Table Identifier values. On the User Device, the values UDDV and NONCE are stored in a manner associating these values with the Identifier value TTID. Other information may be associated with the Call-Up such as the conditions that triggered the Call-Up.

Figure 7:
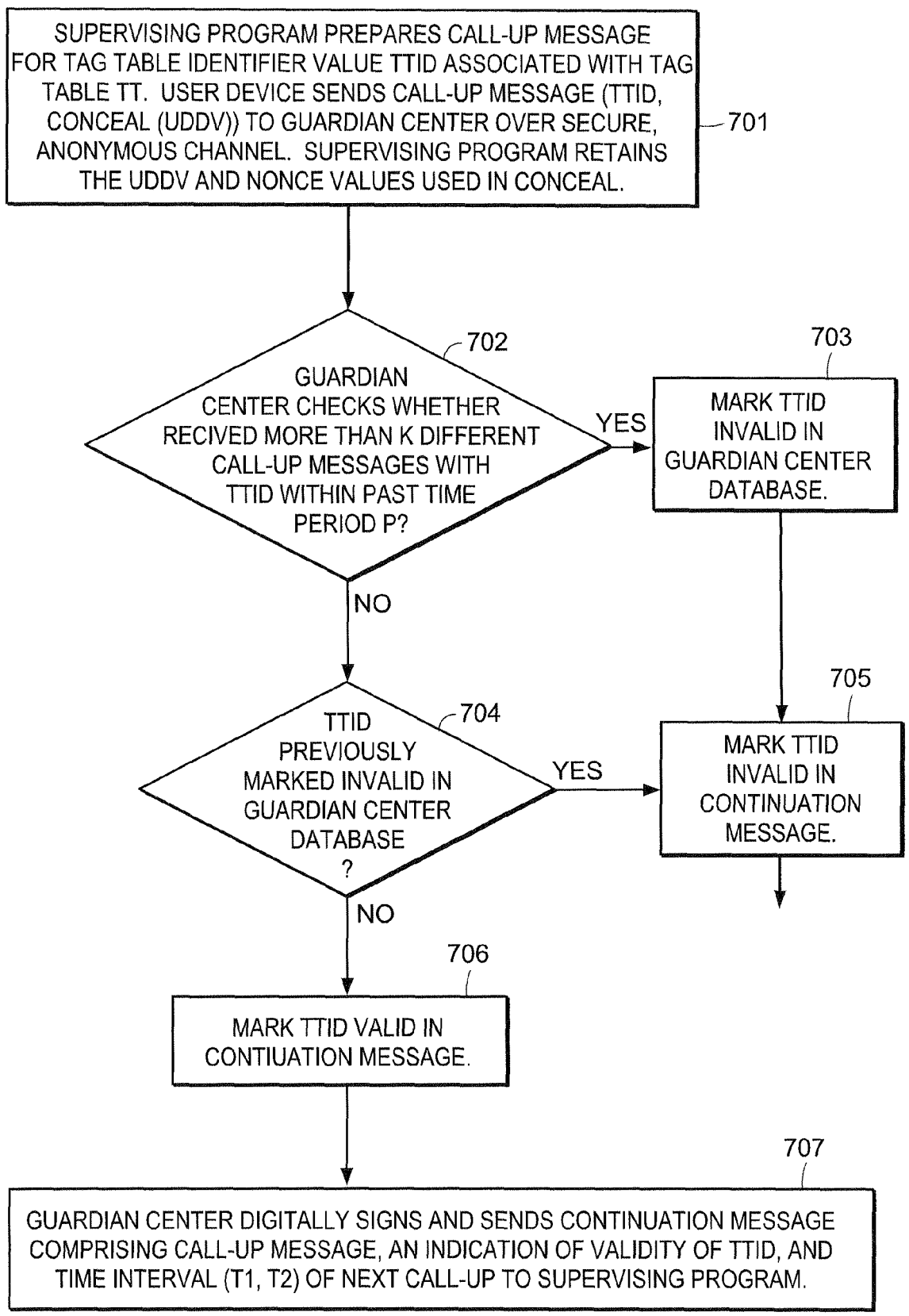
FIG. 7 is a flow chart illustrating the steps for sending a Call-Up message securely to a Guardian Center.
Figure 8:
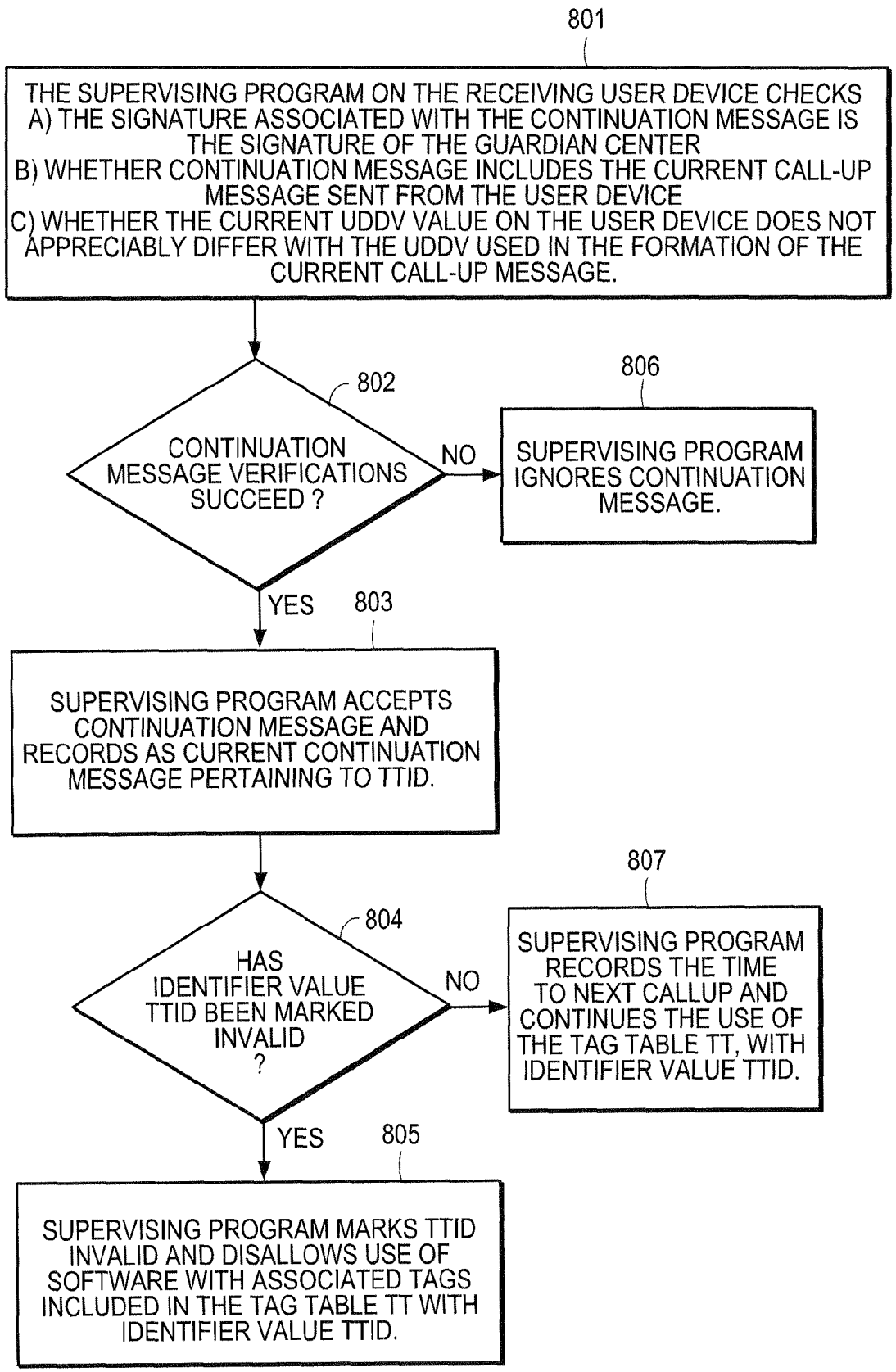
FIG. 8 is a flow chart illustrating the steps for accepting a Continuation Message.

With this background, we describe an embodiment of a Call-Up: i. The User Device may perform a Call-Up a) when the time exceeds T1, the earliest value in the Time Interval for Next Call-Up as recorded in the last received Continuation Message or b) when the Supervising Program on the User Device determines that the current values of the User Device Descriptive Values differ significantly from those associated with the last received Continuation Message or c) because the User asks to perform a Call-Up.

ii. Preparing a Call-Up Message entails a) computing the current values of the UDDV b) generating a NONCE c) computing the hash function value CONCEAL(UDDV)= HASH(UDDV, NONCE) d) looking up the TTID. The Call-Up message then consists of (TTID, CONCEAL (UDDV)). If there are several Tag Table Identifier values, then they are all sent together, preferably with the same CONCEAL(UDDV) in this message. For clarity, we primarily discuss the case of a single Tag Table Identifier value TTID.

iii. Referring to FIG. 7, at step 701, the Supervising Program sends the Call-Up message securely to a Guardian Center, possibly over an anonymous channel, and retains the UDDV and NONCE values. Sending a message securely customarily means sending it in an encrypted form that cannot be modified in transit. An example of a secure transmission protocol is SSL.

iv. At step 702, the Guardian Center determines whether more than a specified number K of different Call-Up Messages have been received for this same Identifier value TTID within a specified time period P. Two Call-Up Messages are different if they have different conceal values HASH (UDDV, NONCE). Based on this determination, the Guardian Center prepares, based on steps 703-706, at step 707 the signed Continuation Message listing indicating which Tag Table Identifier Values (if there are several) in the Call-Up Message are valid, specifying a Time Interval (T1,T2) for the next Call-Up, and including the Supervising Program's entire Call-Up Message. In an exemplary embodiment, the Guardian Center further marks, at step 703, in its database the Tag Table Identifier Values that were determined to be invalid. Tag Table Identifier values thus marked as invalid are indicated as invalid in subsequent Continuation Messages.

v. The Time Interval of Next Call-Up included in the above Continuation Message may further depend on additional information sent in the Call-Up. This additional information may include, but is not limited to a reason for a Call-Up, such as that the current UDDV value on the User Device was determined by the Supervising Program to have significantly changed from its previous value. In this case, the Guardian Center may specify an earlier Time Interval of Next Call-Up.

vi. Referring to FIG. 8, at steps 801-802 the Supervising Program on the receiving User Device accepts the Continuation Message if: a) the signature associated with the Continuation Message is the signature of the Guardian Center b) the signed continuation message includes the Call-Up message just sent as a component c) The current values of UDDV on the User Device do not appreciably differ with from the UDDV used in the formation of the Call-Up message.

vii. At step 803, if accepted, the received Continuation Message is recorded as the most recent Continuation Message pertaining to the Tag Table Identifier values (just TTID alone in the figure) mentioned in it. At step 804-807, the validity of TTID is determined by the Supervising Program according to this Continuation Message. If TTID is determined to be valid, then the Tag Table TT continues to be used 807. Otherwise the use of TT is not permitted and the Tags in TT become invalid 805.

6. Time of Call-Up Credit.

As explained in U.S. application Ser. No. 09/706,074, filed on Nov. 3, 2000 the contents of which are incorporated herein by reference and above, a Guardian Center's Continuation Message pertaining to a Tag Table Identifier value TTID includes a pair (T1, T2) of time values indicating that the next Call-Up pertaining to TTID should occur, in general, no earlier than time T1 and no later than time T2. Quantitatively controlled exceptions to this rule with respect to the early time T1 can be made in order to facilitate transfers of Tag Tables and their associated Identifier values from User Device to User Device, for example, in case of hardware upgrades. If a Call-Up pertaining to TTID is not made before the later time T2, then, again in general, the associated Tag Table TT, the Tags contained in TT, and the copies of software associated with Tags in TT, cannot be used until such time that a Call-Up for TTID is made.

Figure 9:
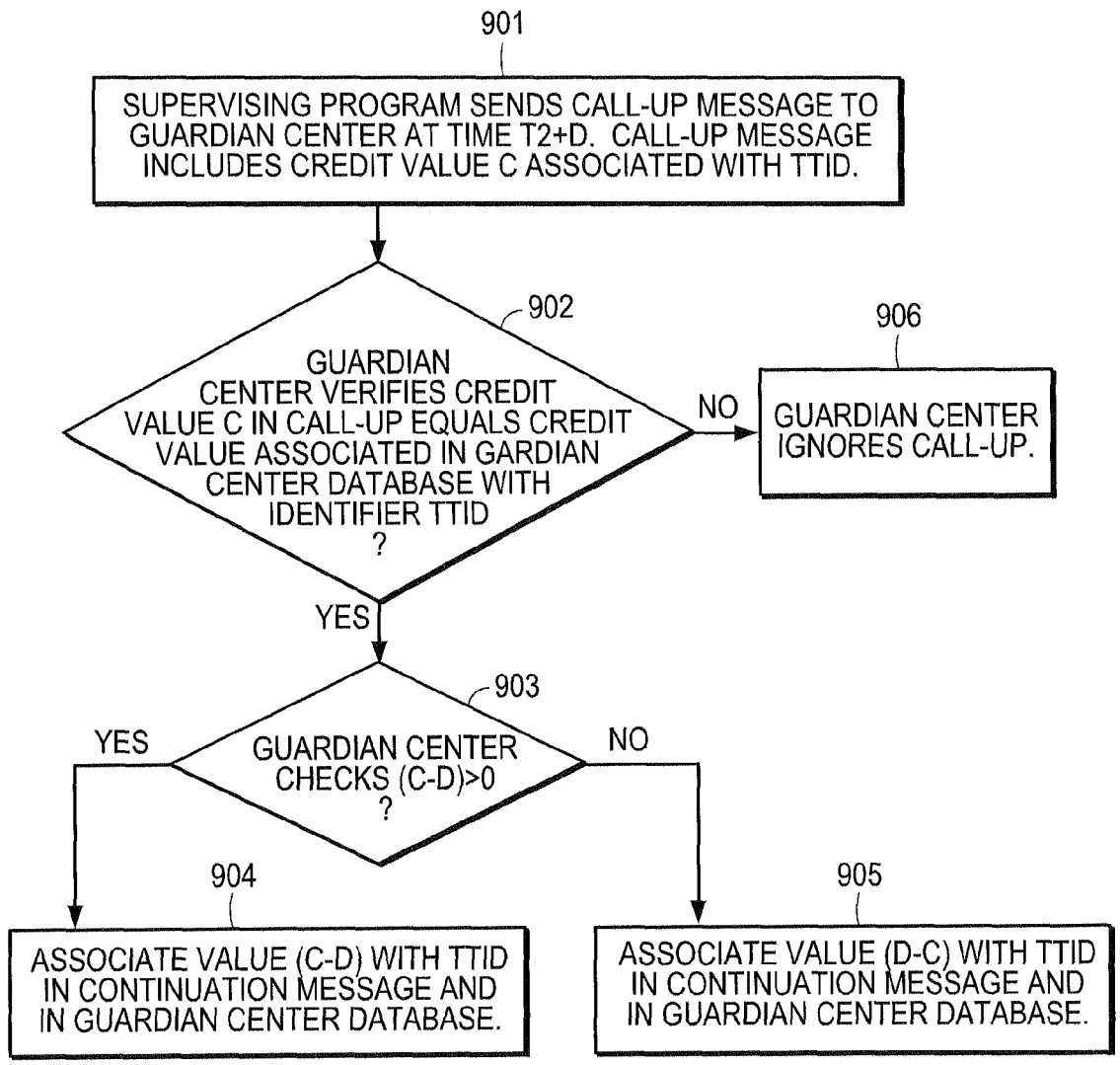
FIG. 9 is a flow chart illustrating the steps for verifying credit.
Figure 10:
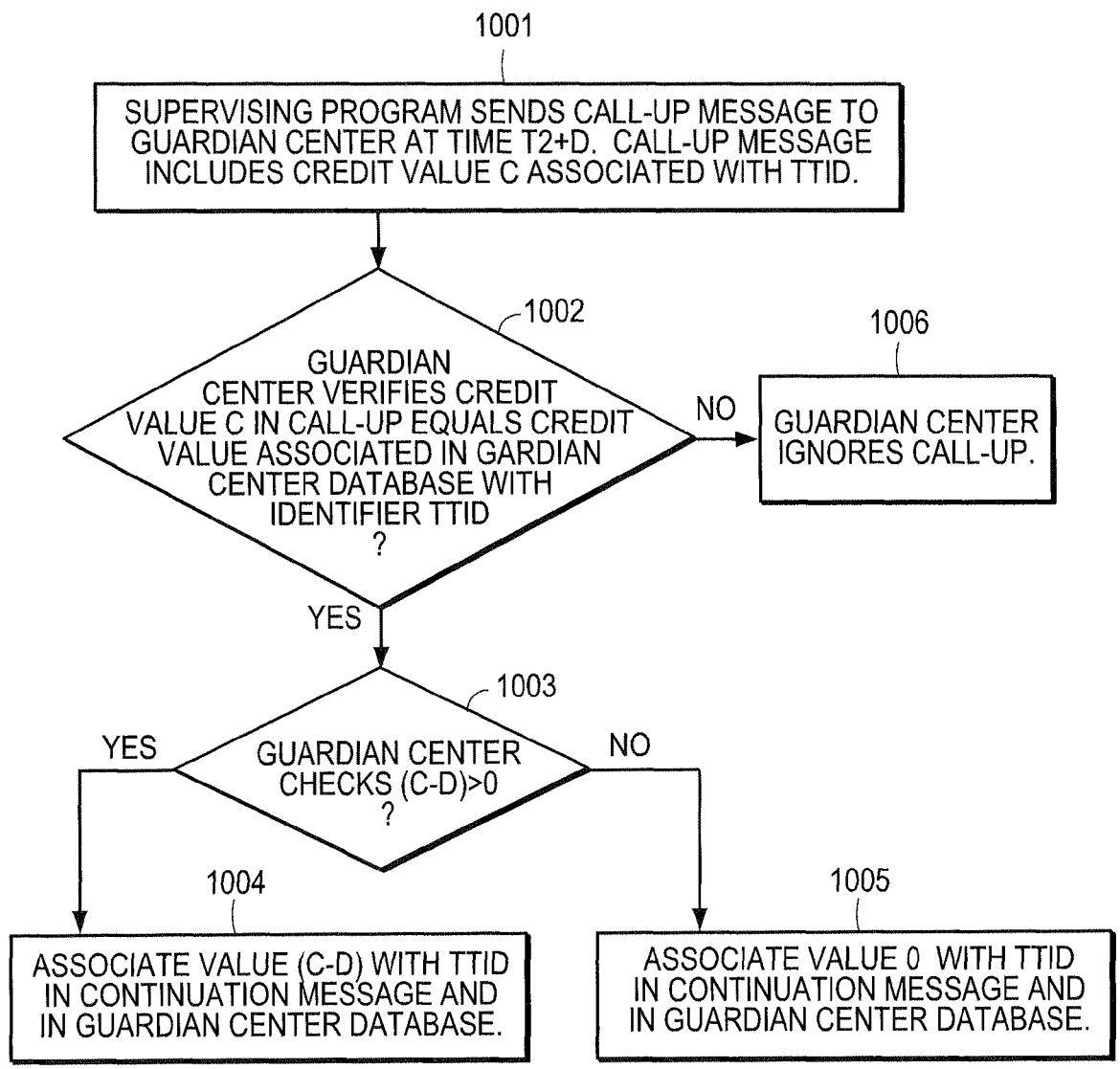
FIG. 10 is a flow chart illustrating an alternate method for verifying credit.
Figure 11:
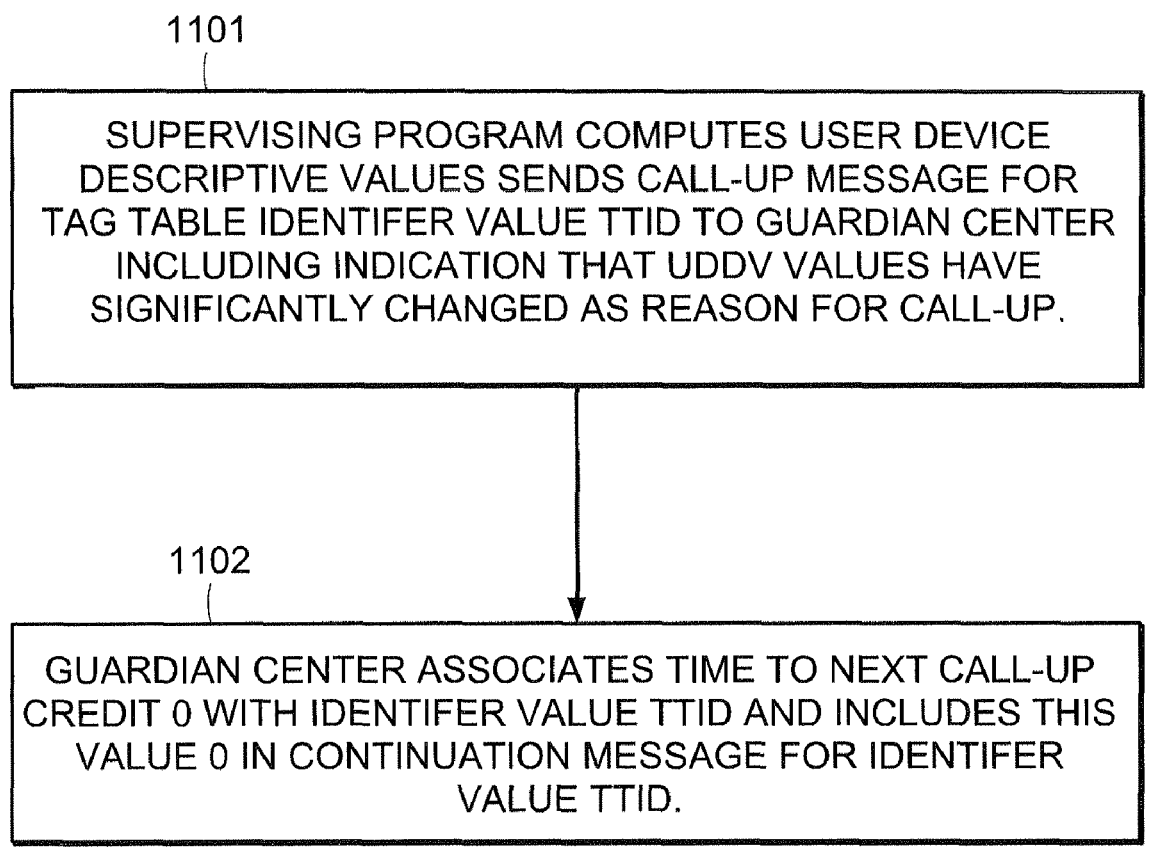
FIG. 11 is a flow chart illustrating the steps for preparing a call-up with current User Device Descriptive Values.

It may sometimes be impossible for a User Device to perform the required Call-Up for TTID before the specified time T2. For example, the User Device may not be able to connect to the Guardian Center because of travel. It will be useful to allow continued use of TT and the software associated with the Tags therein despite this failure to perform a timely Call-Up. An exemplary embodiment of this invention provides for a system of Time Credits specifically associated with the Identifier value TTID. The Guardian Center associates with the Identifier value TTID a credit C representing the total time available for the Identifier value TTID to postpone Call-Ups. Each Continuation Message pertaining to TTID includes the time to Call-Up Credit value C currently available for postponements. When the time T2 to the next Call-Up pertaining to TTID passes, use on the User Devices of Tag Table TT, the Tags contained in it, and the copies of software associated with those tags may continue up to time T2+C, provided that the User Device Descriptive Values in the User Device are not significantly different from those concealed in the most recently received Continuation Message (or perhaps any of the last several Continuation Messages) pertaining to TTID. Referring to FIGS. 9 and 10, when the next Call-Up from the User Device occurs at time T2+D (see step 901 and step 1001), then the Guardian Center at step 902 and step 1002 verifies that the value C in Call-Up equals the Time Credit value associated with the Identifier TTID in the Guardian Center Database. If not equal, then at step 906 and at step 1006 the Call-Up is ignored. If equal, then at step 903 and step 1003, the excess delay time D is subtracted by the Guardian Center from the Time of Next Call-Up Credit C. At step 903 and at step 1003 the difference (C-D) is compared to 0. If positive, then at step 904 and at step 1004 the responding Continuation Message contains the value C-D as the total time available to postpone Call-Ups and this value is now associated with the identifier value TTID. If C-D is negative, then in one exemplary embodiment (at step 1005), the Continuation Message contains the value 0 and in another the Continuation Message will contain the positive value D-C (at step 905).

Referring to FIG. 1, in one embodiment, the Supervising Program in preparing the Call-Up computes the current User Device Descriptive Values. If these values are significantly different from those concealed in the last received Continuation Message, then at step 1101, the Call-Up message states this as a reason for the Call-Up. Processing of Call-Up and preparation of Continuation Message by Guardian Center proceed as described in Section 5 in conjunction with FIGS.

7 and 8. At step 1102, in the responding Continuation Message, from the Guardian Center the Time of Call-Up Credit Value is 0, and this value 0 is associated with the identifier value TTID. The purpose is to avoid certain attacks in which Continuation Messages are transferred from User Device to User Device, and each such continuation Continuation message Message allows postponement of Call-Up, the sum of these postponements enabling illegal overuse of software.

The Guardian Center may increase the Time of Next Call-Up credit associated to TTID according to several rules. An exemplary rule is that after a specified number M of Call-Ups not involving a change of the calling User Device's Descriptive Values, the Time of Next Call-Up credit is restored to its original value C and returned to the User Device in a Continuation Message.

7. Mechanism to Establish a Proof of Purchase.

Figure 12:
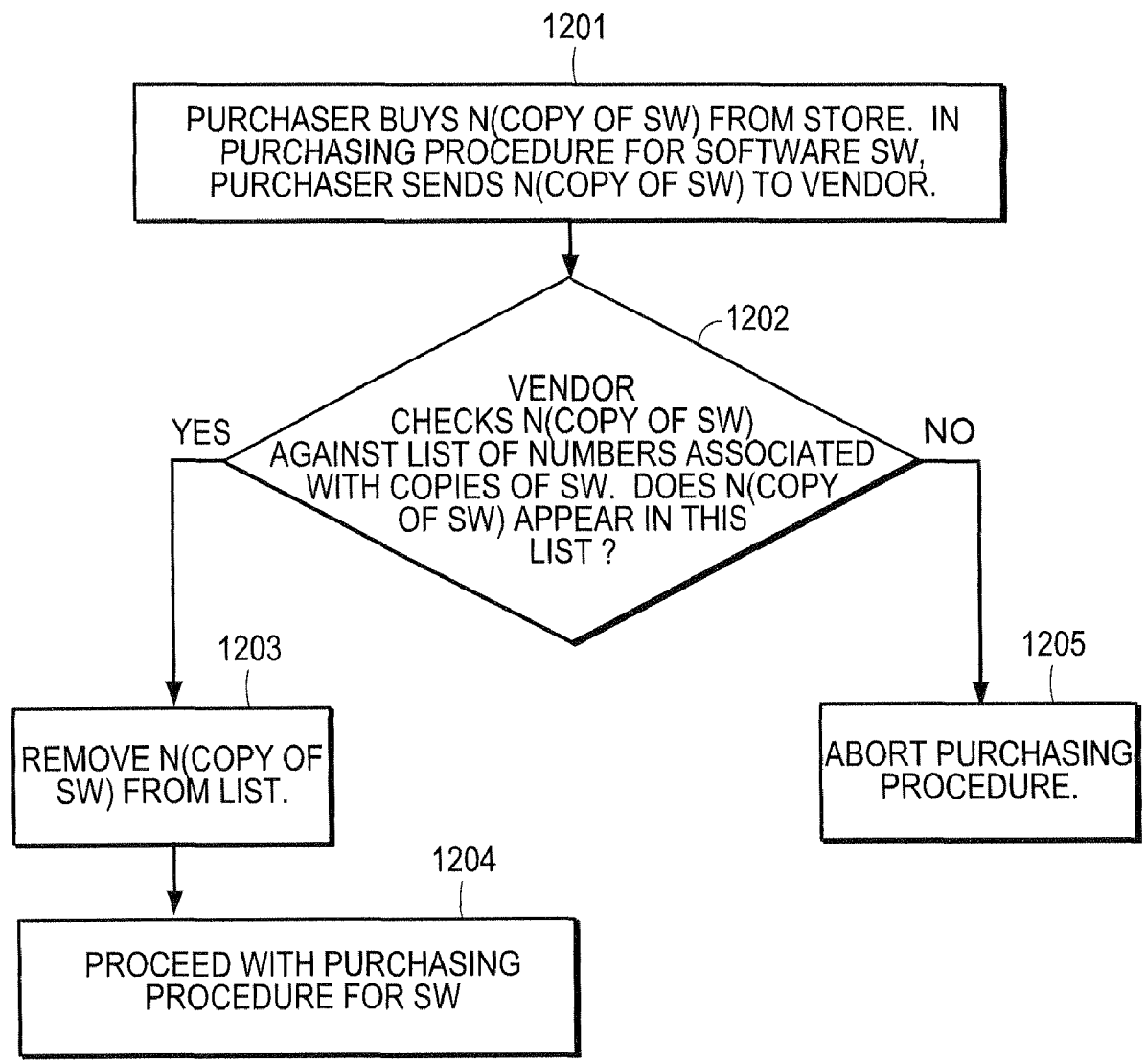
FIG. 12 is a flowchart illustrating a method for securely purchasing software.

In U.S. application Ser. No. 09/706,074, filed on Nov. 3, 2000 the contents of which are incorporated herein by reference several methods of paying for a Purchase Order 101 for Software SW were described. In the present invention, we add methods of payment to be employed when the payment for SW occurs in a store prior to the procedure leading to the creation of the Tag for SW. In an exemplary implementation, individualized information is attached in a concealed form to each copy of SW available in the store. The concealment can be achieved, for example, by inserting this information into a sealed envelope attached to the copy of software so that any tampering with the envelope will be readily detected. In alternate embodiments, other methods of concealment well known to those skilled in the art can be used. An example of such information is a unique number N(Copy of SW) randomly chosen by the Vendor or the Author/Provider of SW from a large set of numbers. Because of the method of choice of the numbers N(copy of SW), it is unlikely that a would-be outside pirate or thief can guess one of these numbers on his own. Referring to FIG. 12, at step 1201 the Purchaser pays for and obtains the concealed information N(copy of SW), with or without SW itself, at the store. In the Purchasing procedure for SW described in U.S. application Ser. No. 09/706,074, the Purchaser enters the information N(Copy of SW) upon demand from the Vendor. At step 1202, the Vendor verifies that this unique information N(copy of SW) appears in the list of numbers he has chosen to be associated with copies of SW and has not yet been removed. If not, the verification fails, then at step 1205 the Purchasing Procedure aborts. If so, the verification succeeds, then at step 1203, the Vendor then removes N(copy of SW) from the list, and in 1204 the Purchasing Procedure continues as detailed in U.S. application Ser. No. 09/706,074.

8. Continued Use of a Tag Table Identifier Value TTID after Compromise.

It is in the interest of Users to keep their Tag Table Identifier values secret. Failure to do so may result in loss to the User through the invalidation of an Identifier value and the associated Tags by actions of an unscrupulous person. Inadvertent revelation of Tag Table Identifier values may however occur from time to time.

To recover from invalidation resulting from revelation of a Tag Table Identifier value TTID, an exemplary embodiment of this invention associates with TTID a secret identifying string S called the Ownership Certificate for the Identifier TTID. The Ownership Certificate S is created by the User through the Supervising Program and, in an exemplary embodiment, is sent to the Guardian Center with the first Call-Up message pertaining to TTID. The Guardian Center records the association between TTID and the Ownership Certificate S. To maintain security, the Certificate S is securely stored by the User, to be subsequently used only if and when the Identifier TTID is invalidated.

Figure 13:
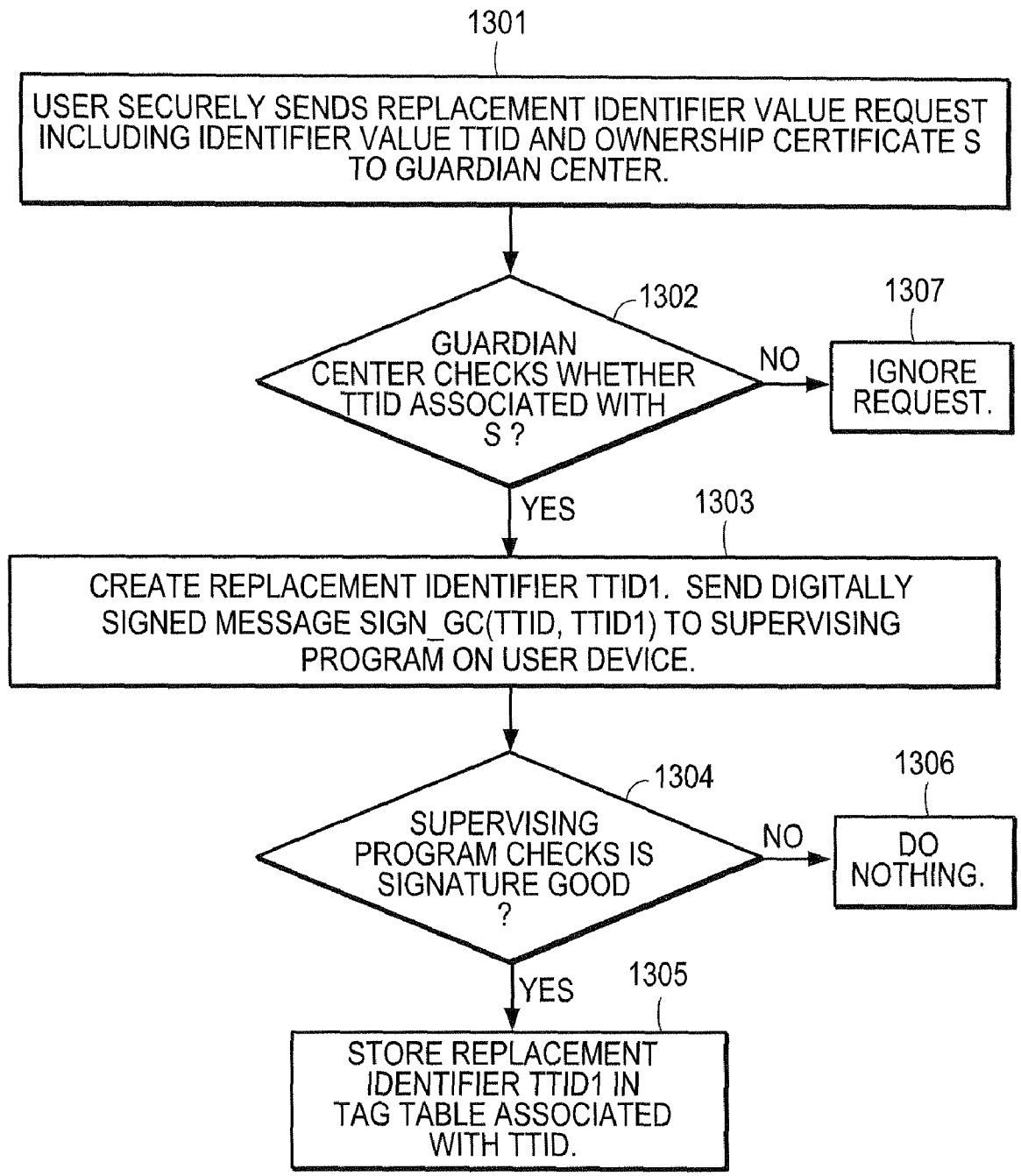
FIG. 13 is a flow chart illustrating the steps for a method of obtaining a new tag identifier.

Referring to FIG. 13, at step 1301, if a User finds that the Identifier value TTID has been invalidated, the User securely sends, a message (TTID, S), to the Guardian Center requesting a Replacement Identifier value for TTID. At step 1302, the Guardian Center verifies, the association between TTID and S. If the verification is successful, then at step 1303, the Guardian Center securely returns a Replacement Identifier value TTID1 to the User Device. This is done by sending a message (TTID,TTID1), digitally signed by the Guardian Center. In the preferred embodiment, the Guardian Center may inform the User Device, within the digitally signed message, that TTID 1 may not be used for a specified time period P. In the lifetime of a Tag Table Identifier value TTID, several Replacement Identifier values for TTID may be successively issued.

Upon receiving the signed message SIGN_GC(TTID, TTID1) at the User Device, at step 1304 the Supervising Program, verifies the digital signature and if the verification is successful at step 1305, stores the Replacement Identifier value TTID1 in the Tag Table TT originally associated with the Identifier value TTID. Henceforth, the Supervising Program employs the Replacement Identifier value TTID1 when making required Call-Ups for the Tag Table TT. In an exemplary embodiment, the Purchasing Program and Supervising Program continue to use the Identifier value TTID when purchasing software and creating and using Tags associated with software, when these Tags are stored in the Tag Table TT originally having the Identifier value TTID.

Figure 14:
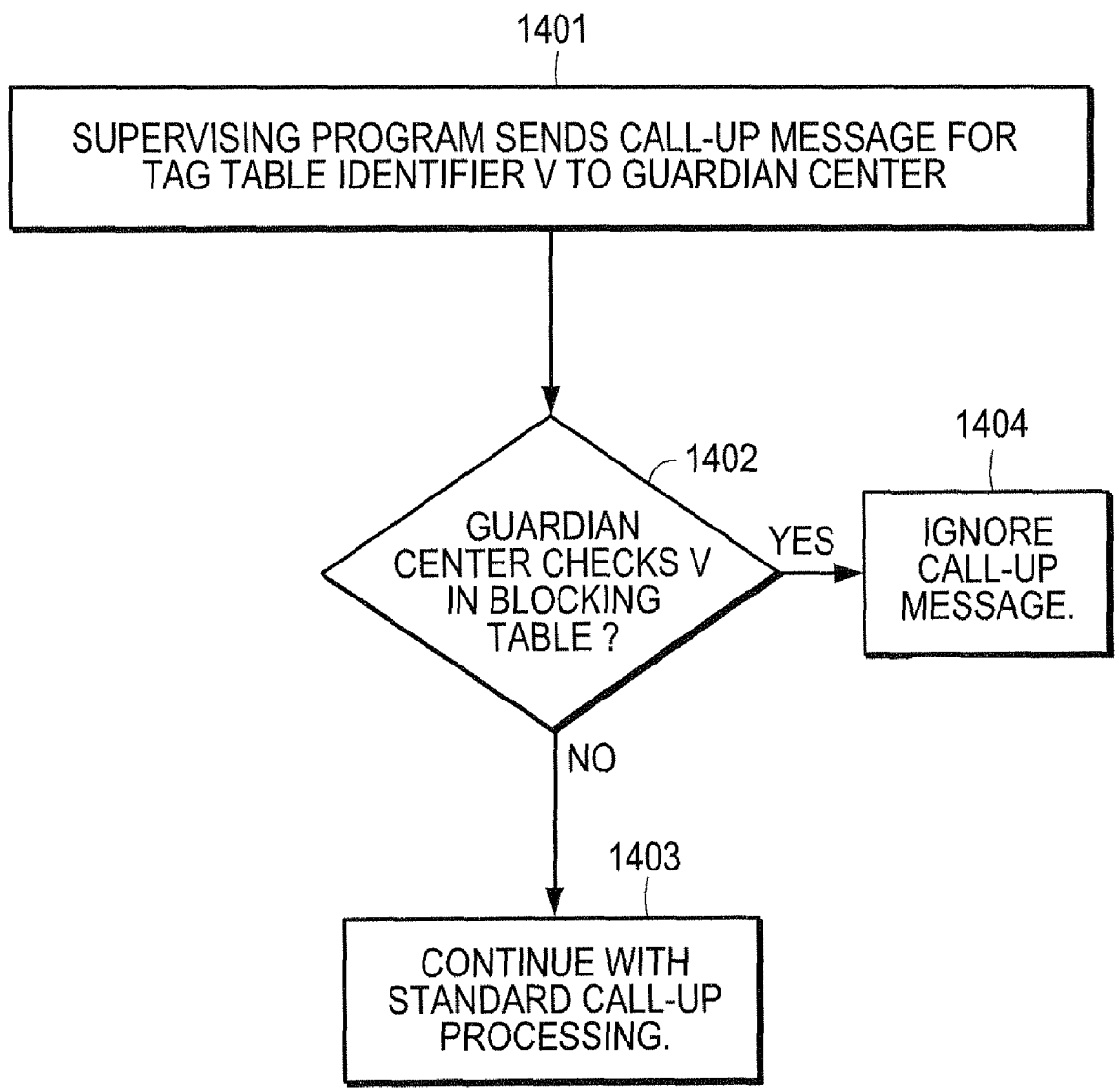
FIG. 14 is a flowchart illustrating the steps for another method of obtaining a new tag identifier.

The Guardian Center replaces in the data structure used according to the referenced Invention to monitor Call-Ups involving the Identifier TTID, by the Replacement Identifier value TTID1. As explained above, the Supervising Program from now on uses the value TTID1 when making Call-Ups for the Tag Table TT. Thus, these Call-Ups will be referred to the correct data structure. The replaced original value TTID is stored in a Blocking Table. Referring to FIG. 14, when a Call-Up involving any Tag Table Identifier value V is made at step 1401, the Guardian Center first checks, at step 1402, whether V is included in the Blocking Table, if so, then, at step 1404, the Call-Up is ignored. In an alternate embodiment, if V is found in the Blocking Table, the Guardian Center returns a signed message not allowing use of V to the User Device making the Call-Up. If the value V is not found in the Blocking Table, then, at step 1403, the Continuation Message is prepared by the Guardian Center in the manner explained above in Section 5.

Figure 15:
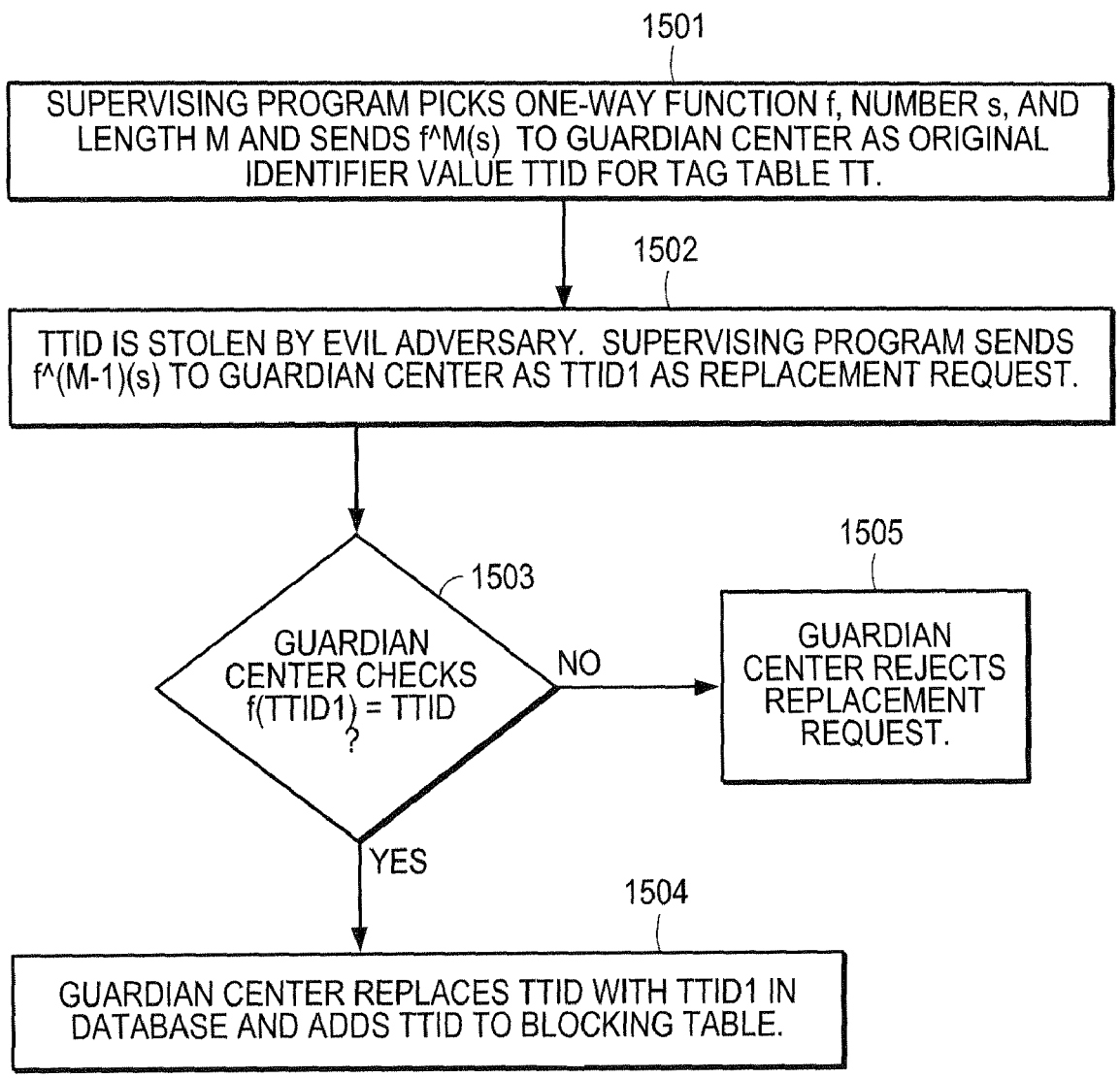
FIG. 15 is a flow chart illustrating the steps for requesting a replacement identifier.

An alternate exemplary embodiment of the invention retains the Blocking Table but the creation of the Replacement Identifier value TTID1 is done in a different way. In that embodiment, the User Device, generates a number s and then applies a one-way function f to that number, generating a sequence of length M of values, $f(s), f(f(s))=f^2(s), f(f(f(s)))=f^3(s), \ldots, f^M(s)$. The initial Tag Table Identifier value for the Tag Table TT is TTID=$f^M(s)$. The Supervising Program stores the number s securely for later use to create Replacement Identifier values when the need arises. Referring to FIG. 15, at step 1501, in the initial Call-Up to register the Identifier value TTID with the Guardian Center, the Supervising Program in the User Device storing the Tag Table TT, sends the one way function f as well as TTID=$f^M(s)$, but not the value s, to the Guardian Center. The Guardian Center creates a data structure for subsequent Call-Ups involving the Identifier value TTID, and correlates it with the function f.

In another embodiment, the function f is part of the Guardian Center and all Supervising Programs use the same function f. Continuing to the description of the creation of a Replacement Identifier value when the need arises, if the Identifier value TTID=f'M(s) is invalidated through malicious action, then the Replacement Identifier value is TTID1=f'(M−1)(s). At step 1502, upon discovering that TTID has been invalidated, the User securely sends the pair (TTID, TTID1) to the Guardian Center, thereby requesting a replacement of TTID by the value TTID1. At step 1503, when receiving the pair (TTID, TTID1) from the Supervising Program, the Guardian Center tests the validity of the Replacement Identifier value TTID by verifying that TTID1= f(TTID). If this verification succeeds then, at step 1504, all other steps of handling the replacement proceed as described for the embodiment shown in FIG. 13. If later on, the identifier TTID1 needs to be replaced, then the Supervising Program uses TTID2=f'(M−2)(s) and everything proceeds as previously explained. This process can be used to implement up to M successive replacements of the Tag Table Identifier value for the Tag Table TT. The advantage of this embodiment is that the User Device's Supervising Program never needs to send s to the Guardian Center, thus avoiding the danger of that this crucial value being captured by a malicious adversary.

9. Protection Against Denial of Service Attacks.

The Guardian Centers and the Protection Information Centers of the referenced and present inventions are exposed, like any server in any system, to attacks by a malicious and coordinated flooding with messages and requests. There are well-known counter measures to such attacks. Here we describe methods for dealing with attacks which are tailored to the centers mentioned above. One method of attack is for malicious agents to attempt to register in the Guardian Center a very large number of fictitious Tag Table Identifier values, thereby overloading its storage and slowing down its response time. Another form of attack is the generation of a large number of Call-Ups concerning Tag Table Identifier values already present in the Guardian Center. Both attacks are countered by making these operations cost time or money to the attackers.

In one exemplary embodiment, the protocols for Call-Ups to a Guardian Center by a User Device requires of the User Device to solve a time-consuming puzzle as a condition for that Call-Up to be processed by the Guardian Center. The Guardian Center has a Gateway front-end computer. The Gateway receives a request from User Devices to perform a Call-Up and sends back a puzzle to be solved by the User Device. Only if the actual Call-Up is prefaced with the solution to the puzzle will the Call-Up be allowed to proceed. The literature contains several examples of puzzles usable to this end and any person versed in the art can readily create or adapt an appropriate puzzle for the purposes of this Invention. Similar techniques may be used to defend the other Protection Information Centers.

In an alternate embodiment of the invention, the excessive registration of Tag Table Identifier values in the Guardian Center is avoided by charging a specified amount of money for each registration.

10. Isolated Protection Centers

In this invention, there are several servers of security information that we call Protection Centers. These include Guardian Centers 130 (FIG. 1), Superfingerprint/Protection Information Centers 150 (FIG. 1) and Certified Time Servers 160 (FIG. 1). In one exemplary embodiment of U.S. application Ser. No. 09/706,074 and the present invention, all these centers employ a Master Digital Signature Key denoted SIG_MASTER whose corresponding verification key VER_MASTER is stored in every User Device. Certain trusted large organizations in government or industry will want to control their own Protection Information Centers so as to avoid Call-Ups to and messages from outside computers, which would expose the organization to hacker attacks. The Protection Information Centers contain the master signature key SIG_MASTER which if leaked out would potentially enable piracy of software. Allowing the Organizations seeking to maintain private protection information centers to have control of the Master Digital Signature Key increases the risk that this key may be revealed to pirates.

Figure 16:
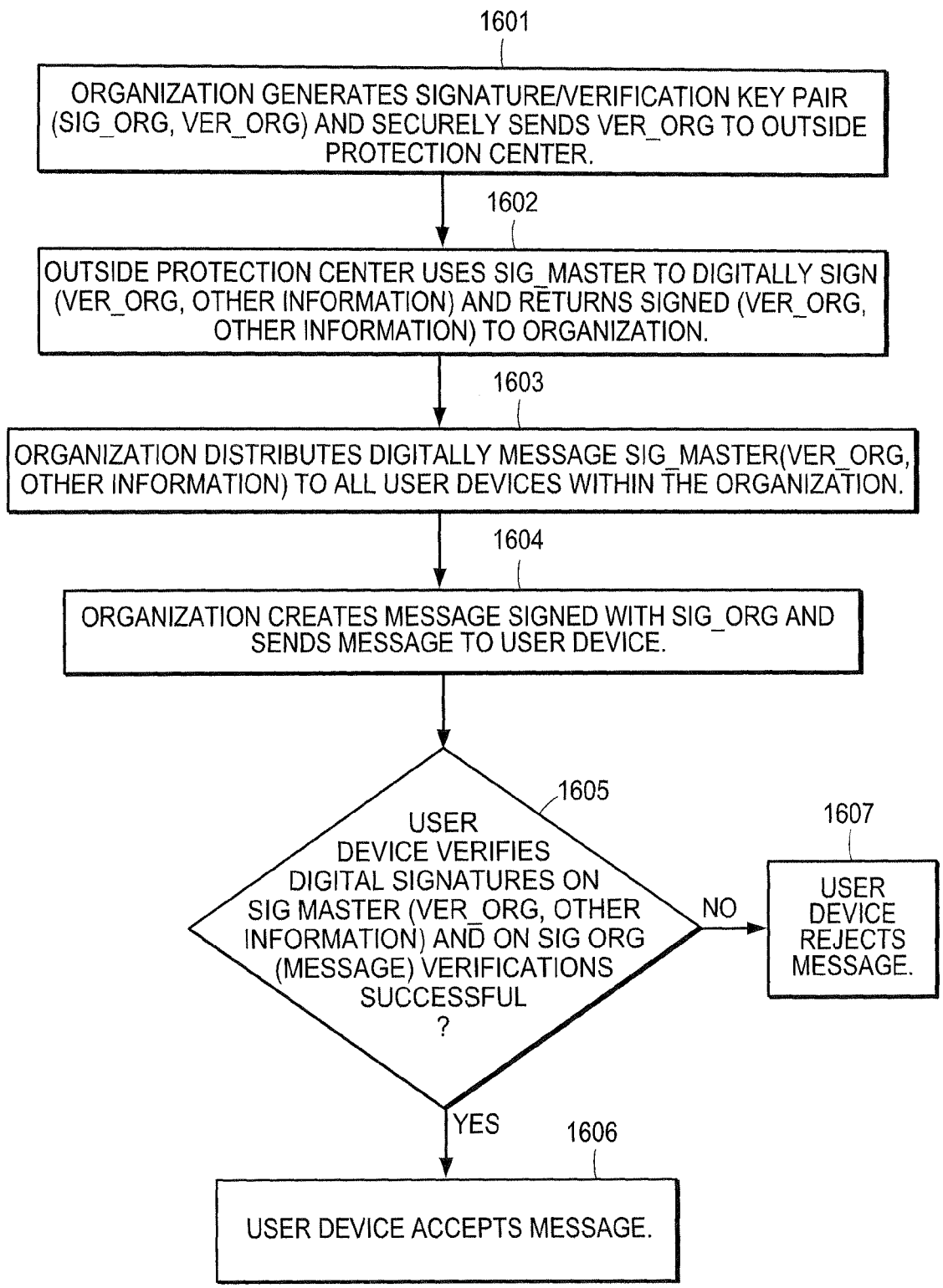
FIG. 16 is a flow chart illustrating the steps for maintaining a private protection center.

In an exemplary embodiment, such organizations may maintain private Protection Information Centers employing signature and verification keys of their own without exposure, while avoiding the danger of the Master Digital Signature Key SIG_MASTER being revealed. We discuss this arrangement in general for any Protection Center. An Organization Protection Center is a Protection Center controlled by an Organization. Referring to FIG. 16, at step 1601 the Organization generates its own signature/verification key VER_ORG and securely sends the verification key to an outside Protection Center having the Master Signature Key SIG_MASTER. At step 1602, the outside Protection Center digitally signs the Verification Key: SIG_MASTER(VER_ORG, other information) authenticating the validity of the Verification Key for User Devices within that Organization. The other information within this digitally signed message includes, in the preferred embodiment, an expiration date and characterization of properties of User Devices that may use VER_ORG. The inclusion of an expiration date for a Verification Key VER_ORG limits the exposure to piracy in case this key is revealed outside the Organization. Then, at step 1603, the Organization distributes SIG_MASTER(VER_ORG, other information) to all its User Devices and can subsequently, at step 1604, use its own digital signature key SIG_ORG for signing Continuation Messages and other messages from the Organization Protection Centers to User Devices within the Organization. Those User Devices use the Organization's Verification Key VER_ORG to verify the signatures on those messages after verifying the digital signature on the message SIG_MASTER(VER_ORG, other information) by using the Signature Verification Key VER_MASTER stored on said User Devices and after verifying the other information included in that message, at steps 1605-1607. In all other aspects the methods of U.S. application Ser. No. 09/706,074 and present Invention are implemented without change in the Organization Protection Centers and the User Devices internal to the Organization.

11. Non-Repudiation.

Figure 17:
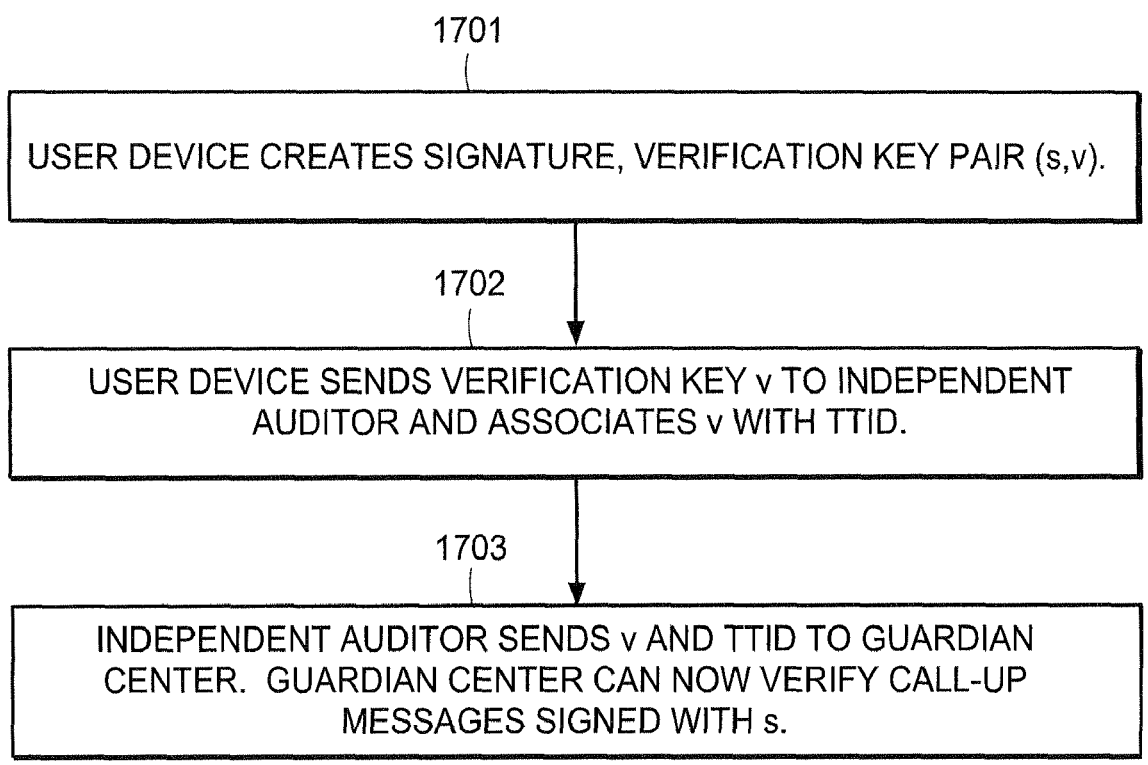
FIG. 17 is a flow chart illustrating the steps for verifying software ownership through a third party.

Because our invention is privacy-preserving, there is a potential problem if the Guardian Center ever invalidates a TTID: The user may deny ever having sent the call-ups that caused this TTID to be invalidated. We can make these Call-Ups impossible to repudiate. Referring to FIG. 17, one way to do this is, upon creation of a TTID t, the User Device, at step 1701, creates a signing, verifying signature pair (s,v), puts the Verification Key v on an independent auditor's site at step 1702, and, at step 1703, the auditor sends v to the Guardian Center. Each Call-Up for t is signed by the User Device using the signature key s. If many TTIDs are included in the same Call-Up, then all their signatures are attached in the order of their TTIDs. When the Guardian Center receives a Call-Up, it may verify the signatures. In this way, the user cannot repudiate his Call-Ups.

12. Trusted Clock

A reliably advancing clock is important to several embodiments of our invention. The Trusted Clock on the User Device should advance in accordance with Certified Time Servers where these Certified Time Servers are set to Greenwich Mean Time. The User Device may show a local time to the User by means of an appropriate offset to the Trusted Clock. A second clock may be entirely under user control but all events pertaining to this invention will pertain to the Trusted Clock, not the second one nor the offset on the Trusted Clock. The intent is that users are able to change the value of the Trusted Clock to be ahead of the time at the Certified Time Server, but not before.

Figure 18:
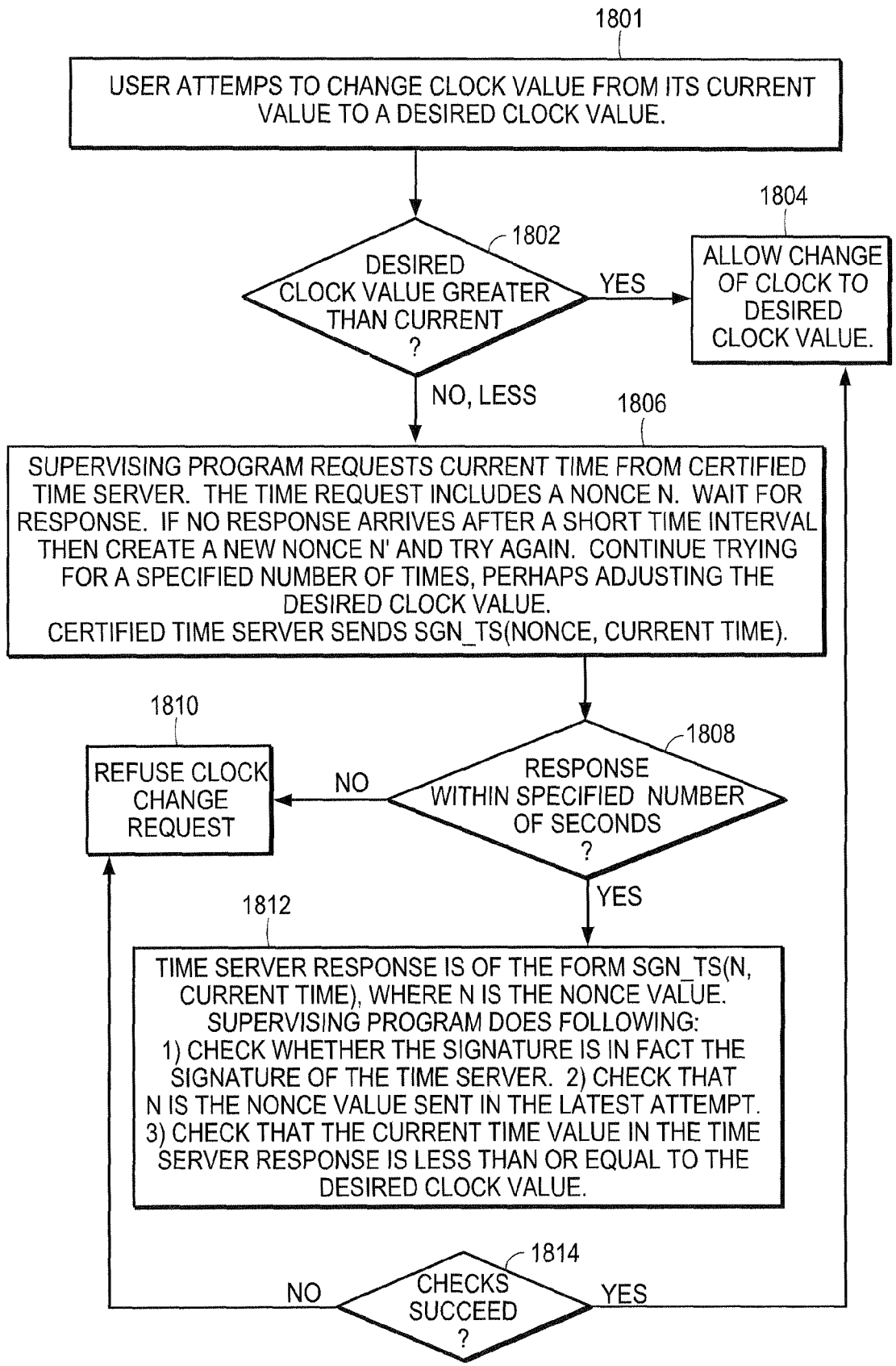
FIGS. 18 and 19 are flowcharts illustrating the steps for setting time on a user device.

This invention contains several mechanisms to support this intent. First, the Supervising Program allows the Trusted Clock to be set forward. Second, if the Trusted Clock is set backward then an "Adjustment Time Check" is performed as illustrated in FIG. 18. The Adjustment Time Check ensures that the time to which the Trusted Clock has been set is greater than or equal to the time of the Certified Time Server. In an alternative embodiment, the new time may be set to a time before the time of the Certified Time Server by a pre-specified amount.

Referring to FIG. 18, at step 1801, the User attempts to change the time of the Trusted Clock on the User Device. At step 1802, the supervising program checks whether the time is advancing. If so, then the request is granted as illustrated in 1804. Otherwise processing proceeds to step 1806, where the Supervising Program requests the current time from the Certified Time Server. This Time Request contains a NONCE N. The Supervising Program waits for a response in a short time, but if it doesn't receive one, it resends the request with a new nonce N'. The Certified Time Server sends a digitally signed message SGN_TS(Nonce, Current Time) where the Nonce is the latest Nonce value sent by the Supervising Program. At step 1808, if this response arrives within a specified number of seconds from the time of the last request, execution proceeds to step 1812. Otherwise the request is denied at step 1810. At step 1812, the Supervising Program verifies that the signature belongs to the Time Server, that the Nonce is the one last sent by the Supervising Program, and that the Current Time returned is less than or equal to the Desired Clock Value. If all these verifications succeed, then execution proceeds to step 1804 where the request is granted. Otherwise at step 810 the request is denied.

Third, when the Supervising Program is first brought up or when it first connects to the internet or if it observes files that have a later date than the date held on the Trusted Clock, the Supervising Program performs a Standard Time Check to ensure the Trusted Clock is greater than or equal to the time at the Certified Time Server. Fourth, as a backup, receipt of mail or other events will, or the passage of time, with some probability, cause a Standard Time Check to verify that the Trusted Clock has an appropriate value. A Standard Time Check works as in FIG. 19.

Figure 19:
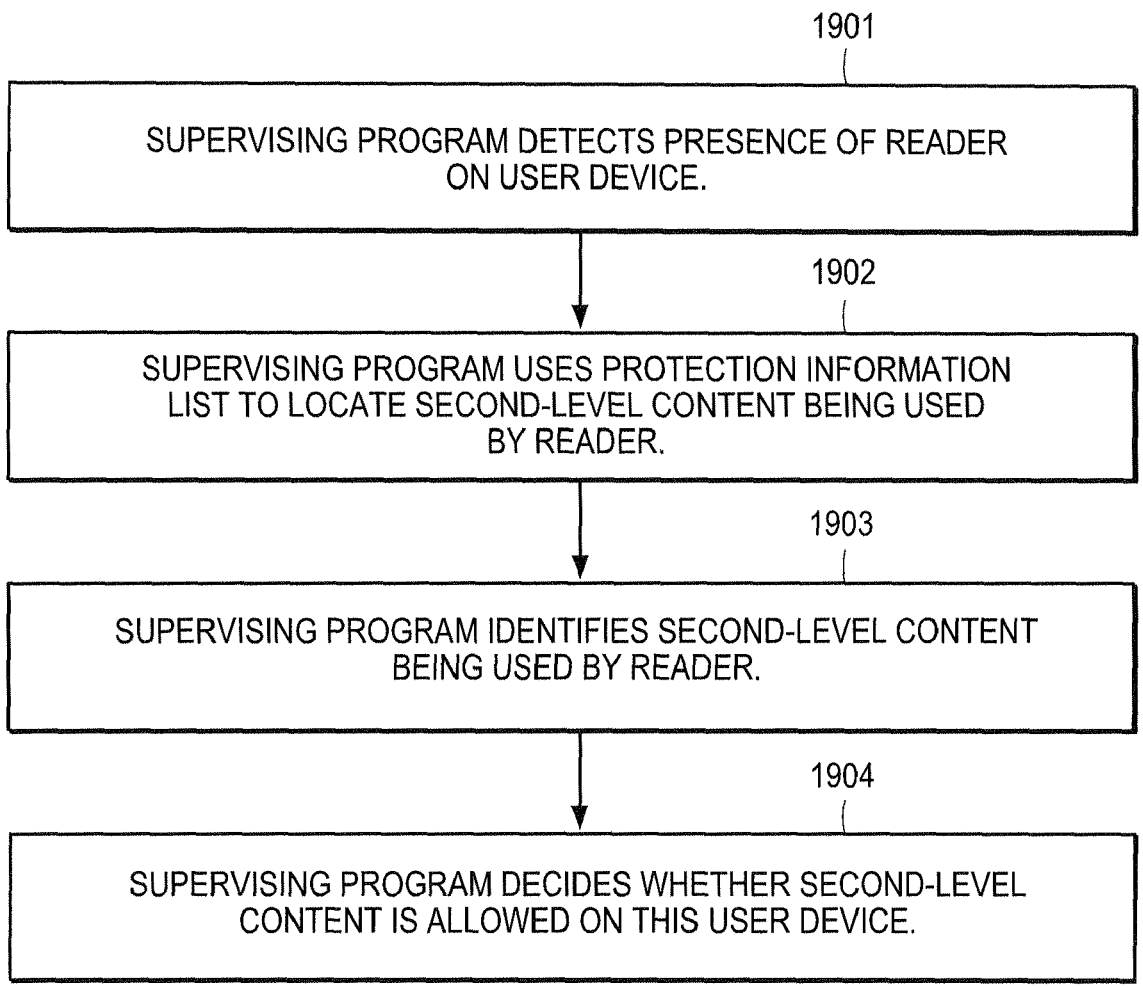

Referring to FIG. 19, at step 1856, the Supervising Program requests the current time from the Certified Time Server. This Time Request contains a NONCE N. The Supervising Program waits for a response in a short time, but if it doesn't receive one, it resends the request with a new nonce N'. The Certified Time Server sends a signed message SGN_TS(Nonce, Current Time) where the Nonce is the latest Nonce value sent by the Supervising Program. At step 1858, if this response arrives within a specified number of seconds from the request, execution proceeds to step 1862. Otherwise punitive action is initiated at step 1860. At step 1862, the Supervising Program verifies that the signature belongs to the Time Server, that the Nonce is the one last sent by the Supervising Program, and that the Current Time returned is less than or equal to the Current Clock Value. In an alternate embodiment, the Current Time may be greater than the Current Clock Value but only by a small pre-specified amount. If all these verifications succeed, then execution proceeds to step 1870 where normal processing continues. Otherwise punitive action is initiated at step 1860.

13. Protection Against Piracy of Second-Level Content

Figure 20:
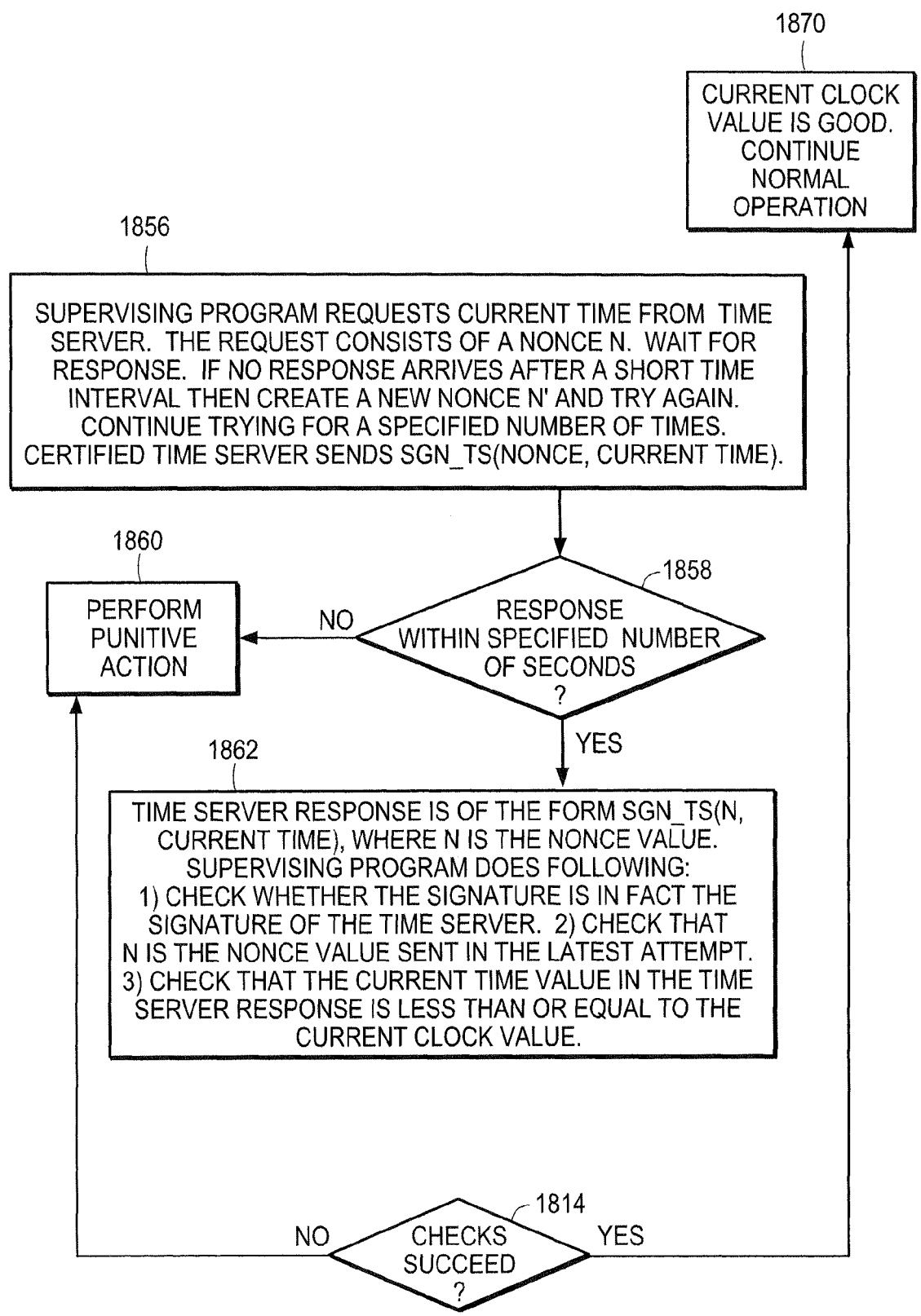
FIG. 20 is a flowchart illustrating the steps for detecting use of a reader on a user device.

Second-Level Content is content accessed on a User Device by a Reader Program. Examples include but are not limited to: The Adobe PDF Reader enables Users to read books in digital form and the book is the Second-Level Content; a Java Virtual Machine reads and executes a Java program and the Java program is the Second-Level Content; an electronic game program enables a User to play a game and the images and other data used in the game are the Second-Level Content; a DVD player program plays a digitized movie and that movie is the Second-Level Content. When Second-Level Content is provided by Vendors or Providers/Authors who have intellectual property and other rights in this Content, these rights can be protected by the methods and mechanisms of the referenced and present inventions. The protection is implemented in four major steps. First, referring to FIG. 20, at step 1901, the use of the Reader on the User Device is detected by the Supervising Program according to the methods and mechanisms of the referenced and present inventions. Second, at step 1902, information about the function of the Reader is included in the Protection Information List present in the User Device and is used by the Supervising Program to locate portions of the Second-Level Content being read by the Reader. Third, at step 1903, Superfingerprints and other Protection Information present in the User Device is used by the Supervising Program according to the methods and mechanisms of the referenced and present inventions to identify the Second-Level Content being read by the Reader. Fourth, at step 1904, once said Content is identified, the Supervising Program determines by the methods and mechanisms of the referenced and present inventions whether the use of this Second-Level Content is allowed on the User Device, and acts according to this determination.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method used by a protection center of sending protection information for protected software to a class of user devices having common properties comprising the steps of:

signing a message including said protection information to be sent, the common properties, and an expiration time for said protection information;

sending the signed protection information from a protection center to a class of user devices, such that the protection information identifies the protected software without revealing information about a user to whom the protected software was sold;

verifying the signed protection information using a verification key;

receiving said signed message by a supervising program on each user device;

at each user device, using the protection information to detect and prevent infringing use of the protected software by verifying, using the supervising program, that the message has been signed by said protection center using a verification key on said user device, that said common properties correspond to one or more of a set of actual properties of the user device and a set of properties listed in the supervising program, and that the expiration time is greater than a current time, where the protection information facilitates the detection and prevention of infringing use of the protected software without requiring modification of the protected software; and upon successful verification, accepting the message by the user device.

2. The method of claim 1 further comprising the steps of:
sending said signed message to user devices; and
downloading said signed message by one of the user devices from one of said other user devices.

3. The method of claim 2 wherein the step of sending sends to at least one storage device and the step of downloading downloads from the at least one storage device.

4. A system used by a protection center of sending protection information to a class of user devices having common properties comprising:
means for signing a message including said protection information to be sent, the common properties, and an expiration time for said protection information;
means for sending the signed protection information from a protection center to a class of user devices, such that the protection information identifies the protected software without revealing information about a user to whom the protected software was sold;
means for verifying the signed protection information using a verification key;
means for receiving said signed message by a supervising program on each user device;
at each user device, means for using the protection information to detect and prevent infringing use of protected software by verifying, using the supervising program, that the message has been signed by said protection center using a verification key on said user device, that said common properties correspond to one or more of a set of actual properties of the user device and a set of properties listed in the supervising program, and that the expiration time is greater than a current time, the protection information facilitating the detection and prevention of infringing use of the protected software without requiring modification of the protected software; and
upon successful verification, accepting the message by the user device.

5. A system of controlling use of protected software on a user device, the system comprising:
one or more processors configured to process a call-up message generated by a user device, the call-up message facilitating prevention of piracy of the protected software, the call-up message configured to include:
a tag table identifier value associated with the protected software;
a set of user device descriptive values, where one or more of the user device descriptive values provide information concerning a state associated with the user device;
a nonce; and
a one-way function; and
said one-way function is applied to said set of user device descriptive values and said nonce to provide a one-way function result value that conceals the user device descriptive values from other devices, where the concealing of the user device descriptive values from other devices provides privacy protection for a user of the user device; and
the call-up message configured to prevent the tag table identifier value associated with the protected software from being used simultaneously on more than one user device.

6. The system of claim 5 wherein the user device sends the call-up message to a guardian center; and
the guardian center responding to the call-up message by invalidating the tag table identifier value if the tag table identifier value has been associated with more than a specified number of call-ups over a period of time.

7. The system of claim 5 wherein the user device sends the call-up message to a guardian center; and
the guardian center responds to the call-up message by securely sending a signed continuation message including said tag table identifier value and said one-way function value in the call-up message.

8. The system of claim 7 wherein the continuation message is used in connection with controlling use of the protected software on the user device.

9. The system of claim 7 further comprising a supervising program executing on the user device;
the supervising program verifying the signature on the continuation message;
the supervising program verifying that the continuation message includes said call-up message;
the supervising program invalidating the associated tag table, for each said invalidated tag table identifier value; and
the supervising program storing the continuation message on the user device.

10. The system of claim 9 wherein the supervising program invalidates all tags associated with said invalidated tag tables.

11. The system of claim 9 wherein in response to receiving a new tag table identifier value, the supervising program includes said new tag table identifier value in a future call-up message;
the guardian center verifying an association between said new tag table identifier value and said original tag table identifier value; and
the guardian center performing further processing based on said original tag table identifier value.

12. The system of claim 5 wherein the user device descriptive values include one or more of the following: number of files on the user device, size of files on the user device, number of directories on the user device, characteristics of indexes used to access data, a processor identifying number, a BIOS identifier, or a network interface identifier.

13. The system of claim 5 wherein the user device descriptive values include biometric information about a particular individual associated with the user device.

14. The system of claim 5 wherein the user device descriptive values are chosen such that they are slowly changing, if at all, during use of the user device.

15. The system of claim 9 wherein the supervising program determines credits associated with the tag table identifier value, where the credits represent the total time available to postpone a call-up message; and
the supervising program preventing the use of credits if the user device descriptive values have changed since the occurrence of a previous continuation message.

16. The system of claim 9 wherein the supervising program determines credits associated with the tag table identifier value, where the credits represent the total time available to postpone a call-up; and
the guardian center decreasing the credits if the user device indicates in a call-up message that its user device descriptive values have changed.

17. The system of claim 5 wherein the call-up message is processed at the guardian center to facilitate detection of use of an infringing copy of software on the user device; and
the guardian center responding to a tag table identifier value that is being used simultaneously on multiple user devices by sending a continuation message specifying that the tag table identifier value is invalid.

18. The system of claim 9 wherein processing, by an authorized server, call-up messages to detect use of an infringing copy of software on the user device further includes responding to determining that a tag table identifier value is being used simultaneously on multiple user devices by sending a continuation message specifying that the tag table identifier value is invalid.

19. The system of claim 18 wherein the other device is the authorized server.

20. A system of re-establishing ownership of a tag table, the system comprising:

an authorized server in communication with a user device, the authorized server receiving a message regulated to re-establishing ownership of a tag table;

the message including a new tag table identifier, an original tag table identifier, an original tag table identifier and an ownership certificate pertaining to the original tag table identifier, where the new tag table identifier identifies a tag table having one or more tags, the tags indicating a right to use protected software;

the authorized server verifying that said ownership certificate pertains to the original tag table identifier and securely sending to the user device a digitally signed message allowing the user device to employ the new tag table identifier; and the authorized server creating an association between said new tag table identifier and said original tag table identifier, said new tag table identifier and said tag table identifier both related to said original tag table identifier.

\* \* \* \* \*